United States Patent
Delhoume et al.

(10) Patent No.: US 12,439,499 B2
(45) Date of Patent: Oct. 7, 2025

(54) CONTROL DEVICE AND METHODS OF OPERATING A CONTROL DEVICE

(71) Applicant: Sonos, Inc., Santa Barbara, CA (US)

(72) Inventors: Alexia Delhoume, Santa Barbara, CA (US); Sara Lincoln, Alexandria, NH (US); Brian Roberts, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 450 days.

(21) Appl. No.: 17/855,678

(22) Filed: Jun. 30, 2022

(65) Prior Publication Data
US 2023/0007759 A1   Jan. 5, 2023

Related U.S. Application Data

(60) Provisional application No. 63/217,746, filed on Jul. 1, 2021.

(51) Int. Cl.
*G06F 3/16* (2006.01)
*H04R 3/12* (2006.01)
(Continued)

(52) U.S. Cl.
CPC ............ *H05B 47/19* (2020.01); *G06F 3/165* (2013.01); *H04R 3/12* (2013.01); *H04R 27/00* (2013.01);
(Continued)

(58) Field of Classification Search
CPC ........... H05B 47/19; G06F 3/165; H04R 3/12; H04R 27/00; H04R 29/007; H04R 2227/003; H04R 2227/005
See application file for complete search history.

(56) References Cited

U.S. PATENT DOCUMENTS 5,440,644 A   8/1995   Farinelli et al.
5,761,320 A   6/1998   Farinelli et al.
(Continued)

FOREIGN PATENT DOCUMENTS

EP   1389853 A1   2/2004
WO   200153994   7/2001
(Continued)

OTHER PUBLICATIONS

AudioTron Quick Start Guide, Version 1.0, Mar. 2001, 24 pages.
(Continued)

*Primary Examiner* — Joseph Saunders, Jr.

(57) ABSTRACT

A method for a control device is disclosed. The method comprises configuring the control device to control a first networked device and while controlling the first networked device and while operating in a first mode, receiving, via the control device, first input data, the first input data indicative of a command to control an illumination device of the first networked device. After receiving the first input data, the method comprises controlling the illumination device of the first networked device. While controlling the first networked device and while operating in a second mode, the method comprises receiving, via the control device, second input data, the second input data indicative of a command to control a playback device of the first networked device. After receiving the second input data, the method comprises controlling the playback device of the first networked device.

17 Claims, 14 Drawing Sheets

(51) Int. Cl.
*H04R 27/00* (2006.01)
*H04R 29/00* (2006.01)
*H05B 47/19* (2020.01)

(52) U.S. Cl.
CPC ..... *H04R 29/007* (2013.01); *H04R 2227/003* (2013.01); *H04R 2227/005* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2014/0254829 | A1* | 9/2014 | Wang ............... H04M 3/56 381/105 |
| 2014/0286517 | A1* | 9/2014 | Luna ............... H05B 47/19 381/332 |
| 2016/0258617 | A1* | 9/2016 | Wang ............... H05B 47/19 |
| 2018/0199083 | A1* | 7/2018 | Sang ............... H05B 47/175 |
| 2018/0336002 | A1* | 11/2018 | Hansen ............... H05B 47/12 |
| 2022/0276772 | A1* | 9/2022 | Lee ............... H05B 45/20 |

FOREIGN PATENT DOCUMENTS

| | | |
|---|---|---|
| WO | 2003093950 A2 | 11/2003 |
| WO | WO-2020032863 A1 * | 2/2020 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

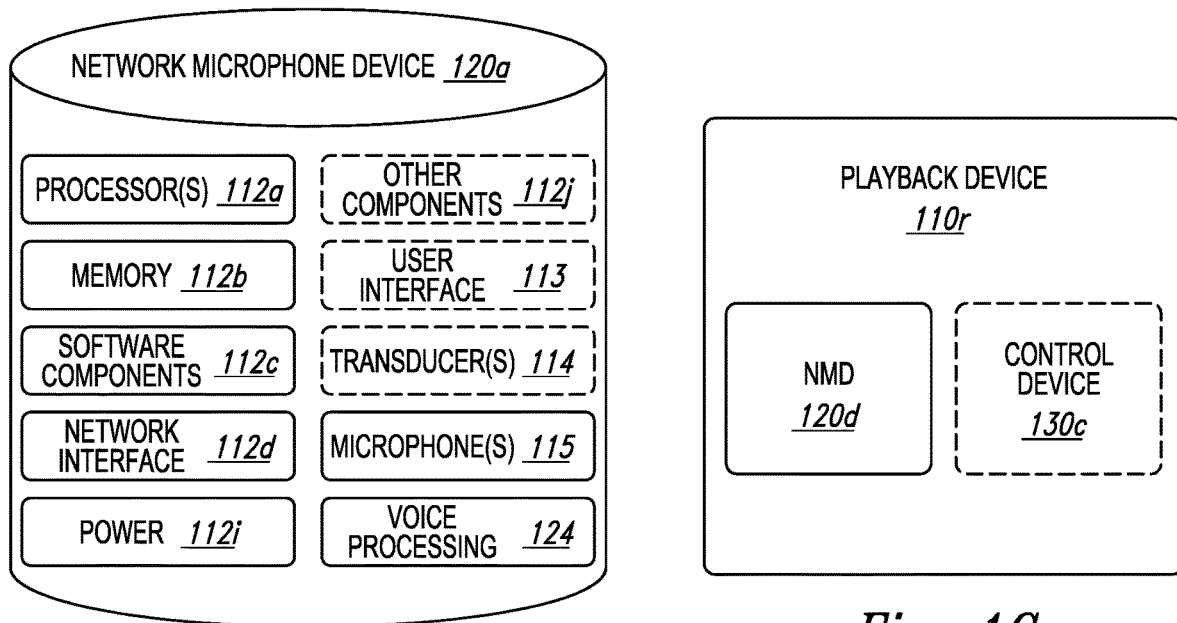
*Fig. 1F*
*Fig. 1G*
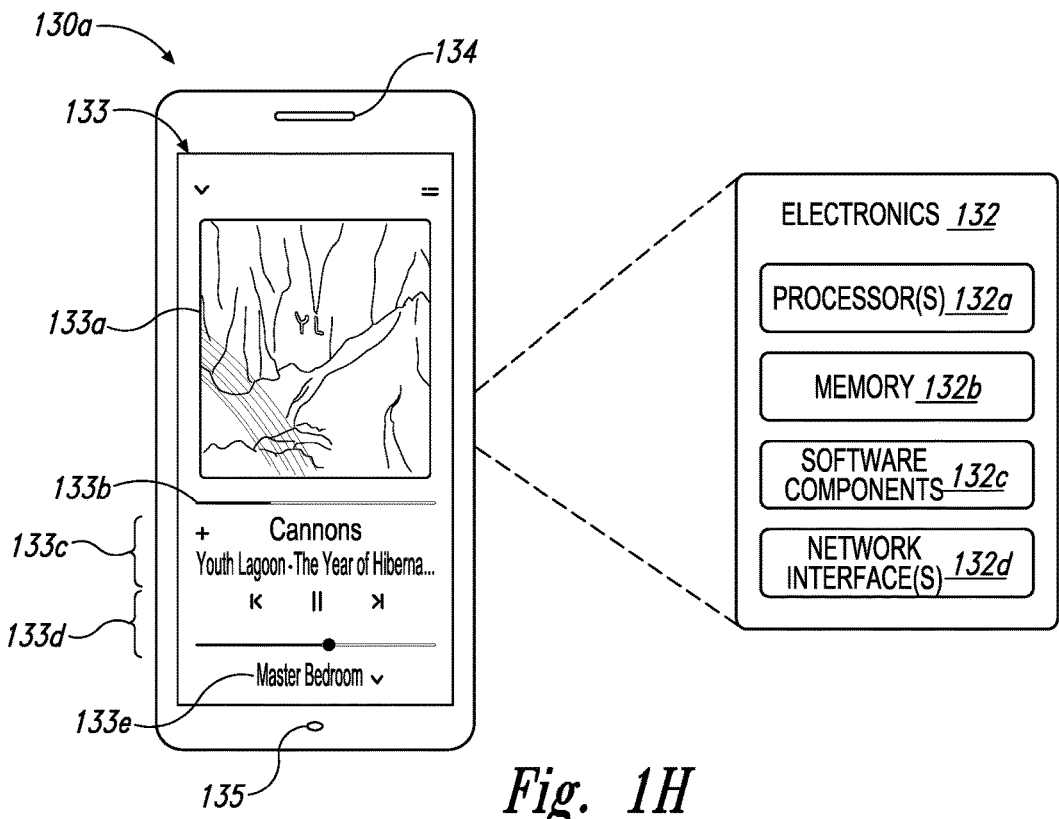
*Fig. 1H*

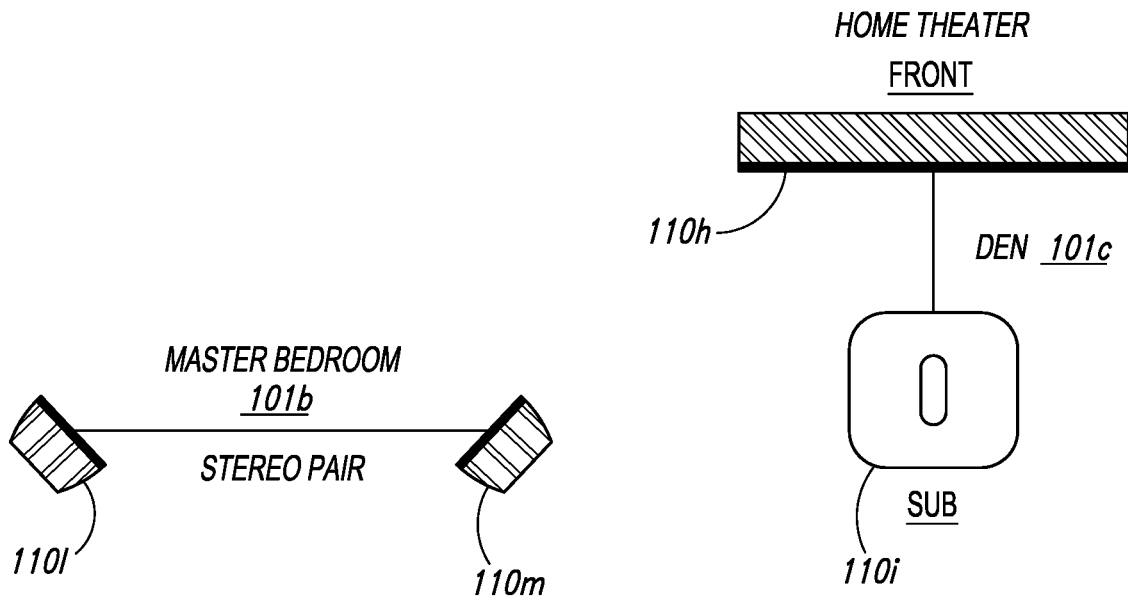
Fig. 1I
Fig. 1J
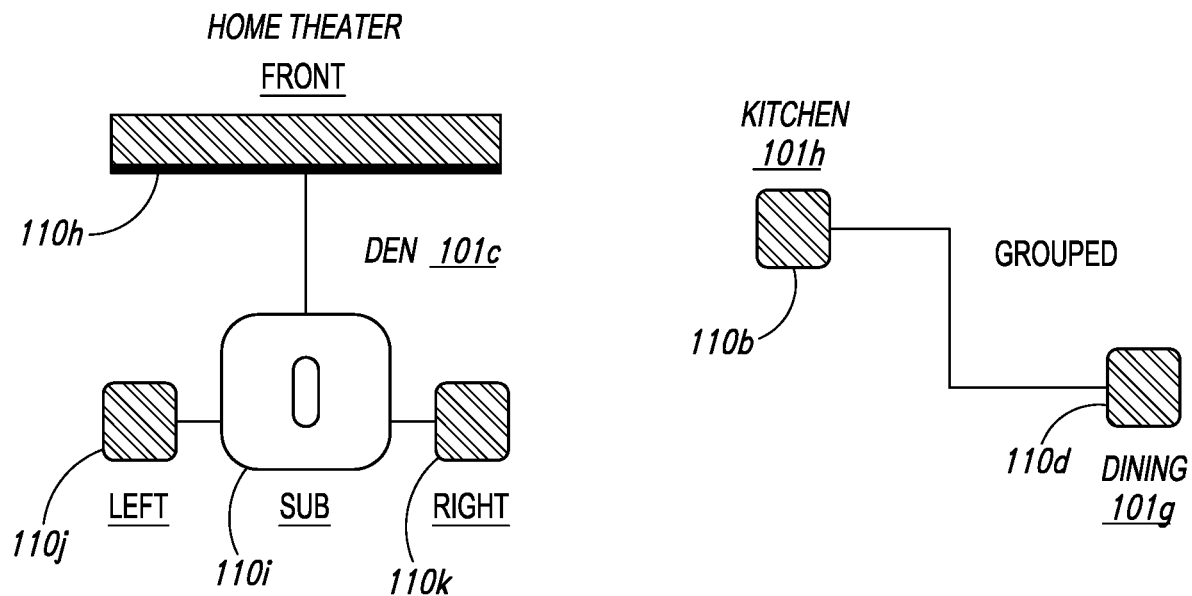
Fig. 1K
Fig. 1L

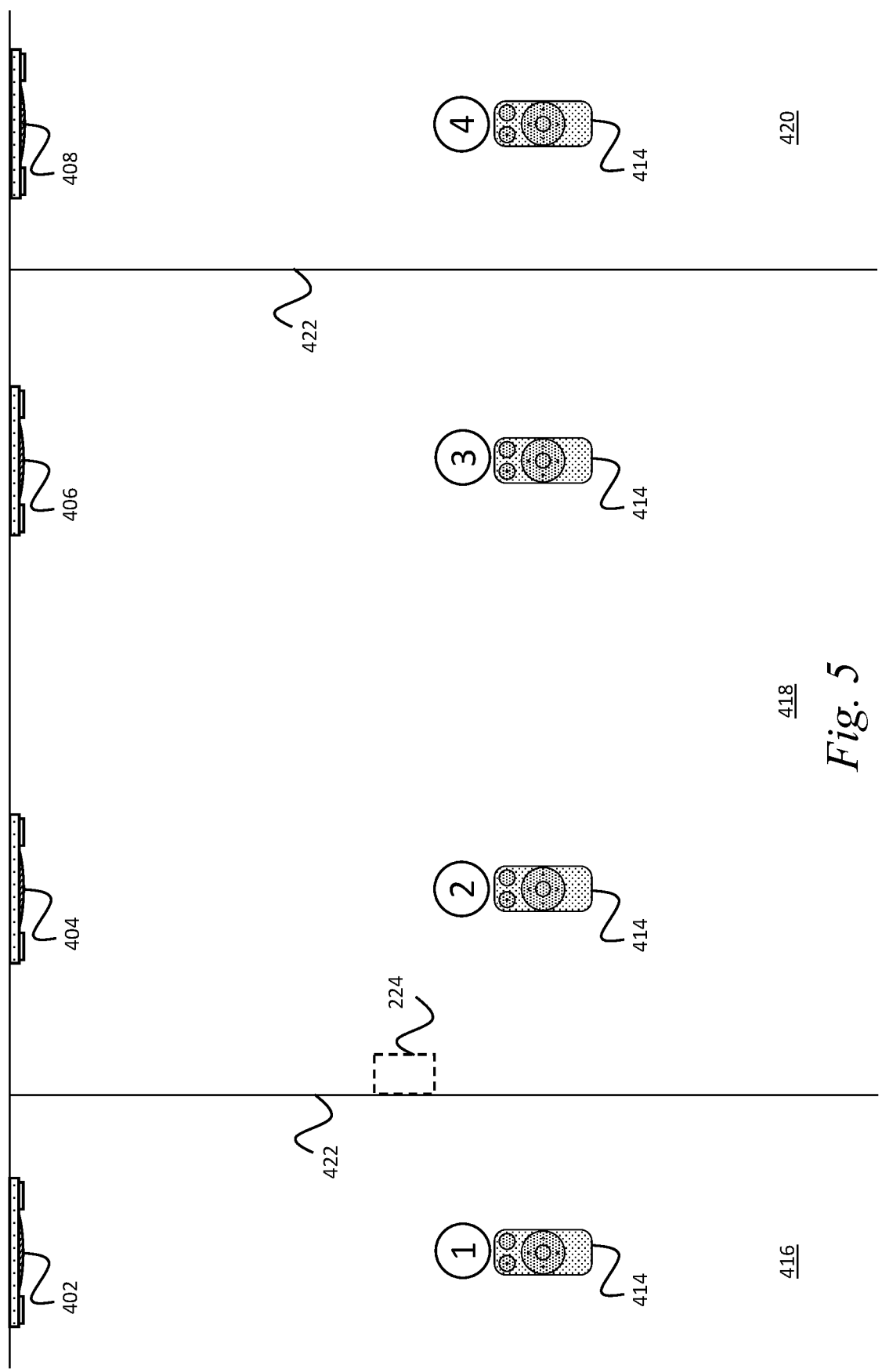

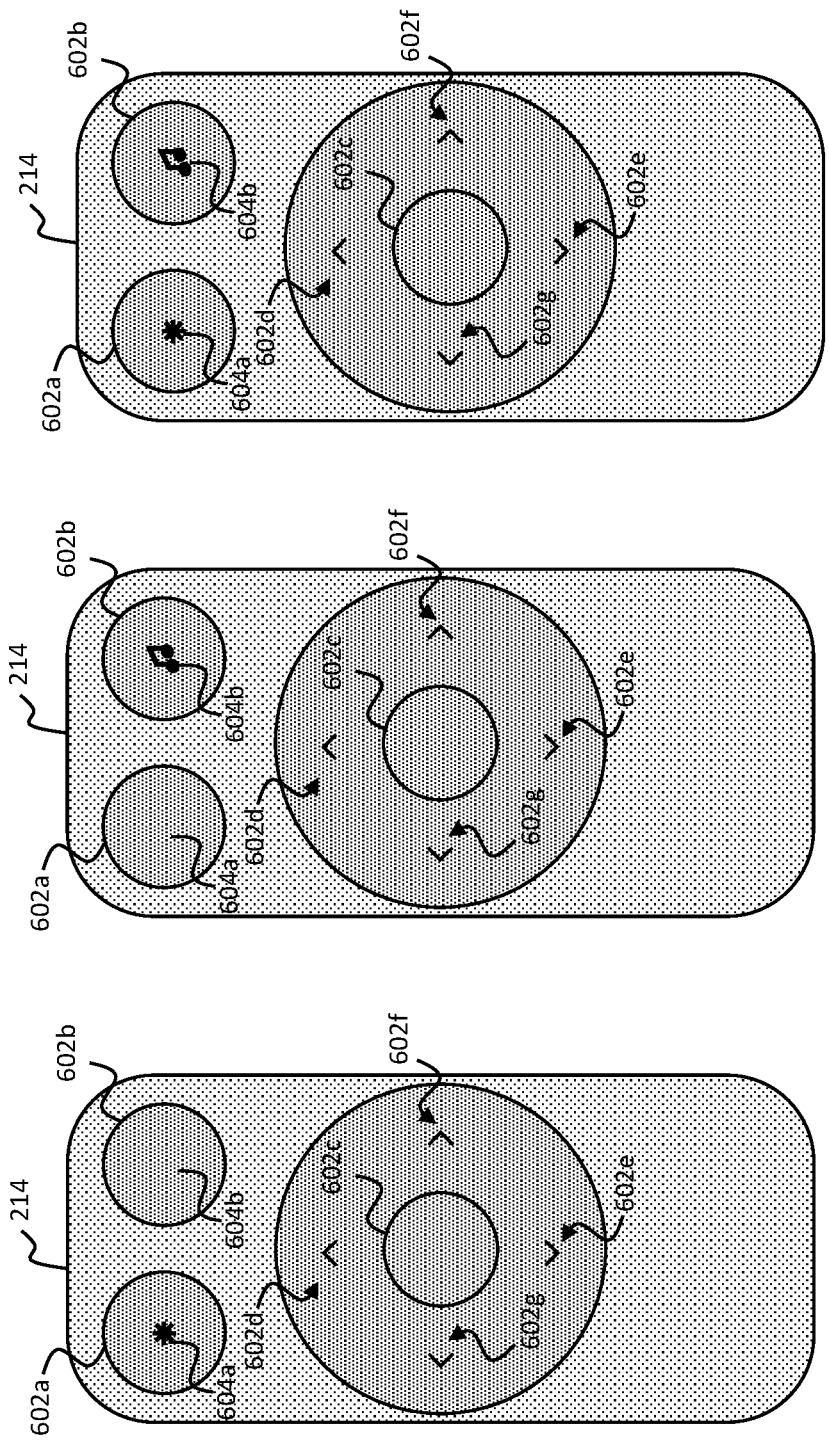

CONTROL DEVICE AND METHODS OF OPERATING A CONTROL DEVICE

CROSS-REFERENCE TO RELATED APPLICATIONS

This application claims the benefit of priority under 35 U.S.C. § 119 to U.S. Provisional Patent App. No. 63/217,746, titled "Control Device and Methods of Operating a Control Device" and filed on Jul. 1, 2021, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1I through 1L are schematic diagrams of corresponding media playback system zones.

FIG. 5 is a schematic diagram of a portion of a media playback system comprising three rooms.

FIG. 6A is a schematic diagram of control device operating in a first mode.

FIG. 6B is a schematic diagram of control device operating in a second mode.

FIG. 6C is a schematic diagram of control device operating in a third mode.

Figure 1A:
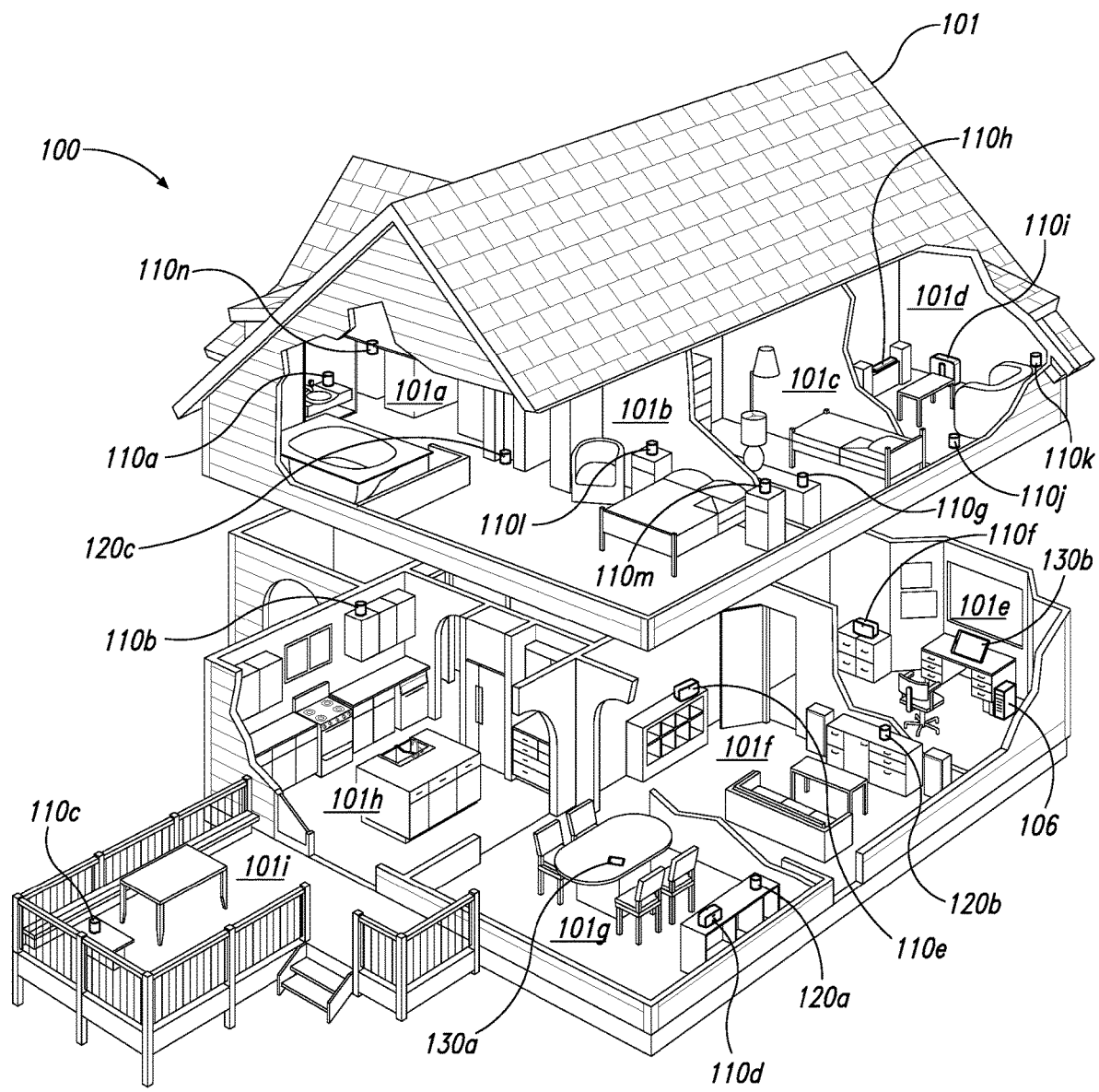
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to methods for a control device (such as a remote) that is moveable throughout a media playback system environment. Further embodiments relate to system architectures of networked devices and control devices.

An example media playback system may comprise one or more areas or zones, each including one or more networked devices. For example, networked devices associated with different areas or zones may be physically located in different locations, such as in the different rooms of a house. For example, a media playback system may include a living room zone, a dining room zone, a kitchen zone, a bathroom zone, a hallway zone, an office zone, and/or a bedroom zone, in which networked devices are located. A control device may control some or all of the networked devices in the playback system.

In some examples, one or more networked devices comprise an illumination device (such as a light) and a playback device. In certain examples, the control device can operate in at least two modes. In a first mode, the control device is configured to control the illumination device of the networked device and in the second mode, the control device is configured to control the playback device of the networked device. A user can switch between modes by operating one or more input interfaces (such as buttons) of the control device.

Accordingly, in some embodiments, a method for a control device comprises configuring the control device to control a first networked device. While controlling the first networked device and while operating in a first mode, the method comprises receiving, via the control device, first input data, the first input data indicative of a command to control an illumination device of the first networked device. In response to (or after), receiving the first input data, the method comprises controlling the illumination device of the first networked device. While controlling the first networked device and while operating in a second mode, the method comprises receiving, via the control device, second input data, the second input data indicative of a command to control a playback device of the first networked device. In response to (or after) receiving the second input data, the method comprises controlling the playback device of the first networked device. Controlling the playback device and/or illumination device may comprise transmitting one or more commands to the playback device and/or illumination device.

To operate the control device in a particular mode, a user may operate one or more input interfaces of the control device. The user can therefore cause the control device to switch between different modes. Accordingly, in some examples, the method comprises receiving, via the control device, third input data, the third input data indicative of a command to operate the control device in the first mode. In response to (or after) receiving the third input data, the method comprises operating the control device in the first mode. The method may further comprise receiving, via the control device, fourth input data, the fourth input data indicative of a command to operate the control device in the second mode. In response to (or after) receiving the fourth input data, the method comprises operating the control device in the second mode.

In some examples, the control device can provide a notification or indication of the particular mode in which it is operating. Thus, in some examples, the control device comprises an indicator assembly, and operating the control device in the first mode comprises generating, by the indicator assembly, at least one of an audio indication and a visual indication to indicate that the control device is operating in the first mode and operating the control device in the second mode comprises generating, by the indicator assembly, at least one of an audio indication and a visual indication to indicate that the control device is operating in the second mode.

In a particular example, the indicator assembly comprises a first indicator and a second indicator, and operating the control device in the first mode comprises generating, by the first indicator, at least one of an audio indication and a visual indication to indicate that the control device is operating in the first mode and operating the control device in the second mode comprises generating, by the second indicator, at least one of an audio indication and a visual indication to indicate that the control device is operating in the second mode. Accordingly, the control device may have a separate indicator for each mode. The first and second indicators may be of the same type or of different types. For example, the first indicator and the second indicator can both be audio indicators (such as different audio tones), both be visual indicators (such as different icons), or one be a visual indicator and the other be an audio indicator.

In some examples, the control device may operate in a hybrid (or third) mode, which is a combination of the first and second modes. When operating the hybrid mode, the control device can therefore be used to control the illumination device or playback device, without needing to switch between modes. Certain input interfaces of the control device may control the illumination device and other input interfaces of the control device may control the playback device. In other examples, certain types of input to an input interface of the control device may control the illumination device and other types of input to the same input interface of the control device may control the playback device. Accordingly, the method may comprise receiving, via the control device, fifth input data, the fifth input data indicative of a command to operate the control device in the first and second modes simultaneously. In response to (or after) receiving the fifth input data, the method comprises operating the control device in a hybrid mode, wherein in the hybrid mode, the control device is configured to receive input data indicative of commands to control the playback device and commands to control the illumination device.

In some examples, as the control device is moved throughout the playback system, the control device detects the presence of one or more networked devices within a proximity of the control device. The control device may therefore be configured to control a networked device that is within a proximity of the control device. Accordingly, in some examples, the method comprises, before configuring the control device to control the first networked device, detecting that the first networked device is within a proximity of the control device. Detecting that the first networked device is within a proximity of the control device corresponds to detecting that the control device is within a proximity of the first networked device.

In some examples, networked devices can be grouped together in zones (also known as networked zones) and be controlled in unison. Accordingly, in some examples, the method further comprises determining that the first networked device forms part of a first networked zone, wherein the first networked zone comprises the first networked device and a second networked device, and wherein the first networked device and the second networked device each comprise an illumination device and a playback device. The first input data is therefore indicative of a command to control the illumination devices of the first and second networked devices and controlling the illumination device therefore comprises controlling the illumination devices of the first and second networked devices. Similarly, the second input data is therefore indicative of a command to control the playback devices of the first and second networked devices and controlling the playback device therefore comprises controlling the playback devices of the first and second networked devices.

Determining that the first networked device forms part of a first playback zone may comprise receiving a state variable from the first networked device or another networked device (such as the second networked device), where the state variable indicates that the first and second networked devices are members of the first networked zone. In some examples, the method comprises detecting that the first networked device is within a proximity of the control device. In some examples, the method comprises detecting that the first networked device and the second networked device are within a proximity of the control device.

In some examples, the first and second networked devices are not part of the same networked zone. In such an example, even though the devices are not grouped, it may be useful to control the illumination devices of the networked devices at the same time using the control device. Accordingly, in some examples, the method comprises detecting that the first networked device and a second networked device are both within a proximity of the control device, wherein the first networked device and the second networked device each comprise an illumination device and a playback device, and determining that the first networked device forms at least part of a first networked zone and the second networked device forms at least part of a second networked zone. Accordingly, while operating in the first mode, the method may comprise receiving, via the control device, sixth input data. In response to (or after) receiving the sixth input data, the method comprises controlling both the illumination devices of the first and second networked devices. In contrast, while operating in the second mode, the method comprises receiving, via the control device, seventh input data. In response to (or after) receiving the seventh input data, the method comprises controlling a playback device of one of the first networked device and the second networked device. For example, only the playback device of the "nearest" networked device may be controlled.

As mentioned above, the particular zone grouping can be determined through the use of state variables. In some examples, it is further detected that the first and second networked devices are located within a particular room or area.

In another example, the method comprises determining that the first networked device is within a proximity of the control device and determining that the first networked device and a second networked device are located within a particular room or area. The method further comprises determining that the first networked device forms at least part of a first networked zone and that the second networked device forms at least part of a second networked zone. The first networked device and the second networked device each comprise an illumination device and a playback device. While operating in the first mode, the method comprises receiving, via the control device, sixth input data. In response to (or after) receiving the sixth input data, the method comprises controlling both the illumination devices of the first and second networked devices. While operating in the second mode, the method comprises receiving, via the control device, seventh input data. In response to (or after) receiving the seventh input data, the method comprises controlling a playback device of one of the first networked device and the second networked device. Accordingly, in some examples, only the proximity to the first networked device is detected, and the control device determines the presence of the second networked device via other means, such as through the use of state variables which indicate that the first networked device is within a room or area with a second networked device.

As the control device is moved throughout the playback environment, the control device can detect the presence of new networked devices and move out of range/proximity of other networked devices. Accordingly, the method may further comprise detecting that the first networked device is no longer within a proximity of the control device and detecting that a second networked device is within a proximity of the control device. The method further comprises configuring the control device to control the second networked device. In some examples, the method further comprises, while controlling the second networked device and while operating in the first mode, receiving, via the control device, eighth input data, the eighth input data indicative of a command to control an illumination device of the second networked device. In response to (or after) receiving the eighth input data, the method comprises controlling the illumination device of the second networked device. While controlling the second networked device and while operating in the second mode, the method comprises receiving, via the control device, ninth input data, the ninth input data indicative of a command to control a playback device of the second networked device. In response to (or after) receiving the ninth input data, the method further comprises controlling the playback device of the second networked device. Accordingly, as the control device moves throughout the playback system, the control device is updated to control the second networked device.

In some examples, the control device can notify a user when the control device is within (or no longer within) a proximity of a particular networked device. Accordingly, in an example, the control device comprises an indicator assembly and the indicator assembly is configured to generate at least one of an audio indication and a visual indication in response to (or after) at least one of: (i) detecting that the first networked device is no longer within a proximity of the control device, and (ii) detecting that the second networked device is within a proximity of the control device.

In some examples, the control device comprises a plurality of input interfaces (such as buttons), which when operated, generate input data which is therefore received by the control device. Depending upon which device the control device is controlling and which mode the device is operating in, a single button may control different functions of different devices. Accordingly, the control device comprises at least a first button, and wherein: operation of the first button at a first time generates the first input data, operation of the first button at a second time generates the second input data, operation of the first button at a third time generates the eighth input data and operation of the first button at a fourth time generates the ninth input data.

Various methods of detecting whether a networked device is within a proximity of the control device are possible. In a first example, detecting that the first networked device is within a proximity of the control device comprises receiving, from a computing device, a signal and in response to (or after) receiving the signal, determining that the first networked device is within a proximity of the control device. The computing device may be a beacon, such as a Bluetooth Beacon. The computing device may comprise an NFC module or transponder. The signal may identify a location (which is used to obtain one or more device identifiers of networked devices associated with that location), or may comprise one or more device identifiers of networked devices associated with a location, or may comprise an identifier of the computing device itself (which is used to obtain one or more device identifiers of networked devices associated with a location).

In some examples, the first networked device comprises the computing device. In other examples, the computing device is separate to the first networked device.

In a second example, as the control device moves throughout the environment, motion of the control device is detected. The control device may comprise one or more motion sensors, such as an accelerometer. Based on the detected motion, a location of the control device can be determined or inferred. Accordingly, in the second example, detecting that the first networked device is within a proximity of the control device comprises detecting motion of the control device and, based on the detected motion, determining a location of the control device. The method further comprises determining that the first networked device is associated with the location. The location may be a "final" location of the control device.

In some examples, before detecting the motion, the method comprises determining an initial location of the control device. The method comprises detecting motion of the control device from the initial location. In some examples, detecting the initial location comprises determining which networked device the control device is currently controlling. Determining the final location of the control device may therefore be based on the initial location.

In a third example, the location of the control device can be determined based on the strength of signals received from one or more devices (such as one or more networked devices). Accordingly, detecting that the first networked device is within a proximity of the control device comprises receiving, from the first networked device, a first signal having a first signal strength, receiving, from a second networked device, a second signal having a second signal strength and determining, based on the first and second signal strengths, that the control device is closer to the first networked device than the second networked device, wherein the first signal strength is stronger than the second signal strength. In other examples, a received signal can be compared to a threshold to determine proximity. For example, a received signal may be compared to a predetermined signal strength threshold, such as a predetermined Received Signal Strength Indication, RSSI. Alternatively or additionally, the received signal may be compared to a predetermined signal quality threshold such as a Bit Error Rate, BER, threshold or a RSSI threshold. (RSSI can indicate a strength of a signal above a noise floor and also give an indication of signal quality.)

In a fourth example, the control device comprises a microphone, and the location is determined by receiving data transmitted in an acoustic signal from one or more networked devices. Accordingly, detecting that the first networked device is within a proximity of the control device comprises receiving, by a microphone of the control device, an acoustic signal from the first networked device and based on the acoustic signal, determining that the first networked device is within a proximity of the control device. Data transmitted in an acoustic signal may be audible, such as below about 18 kHz or substantially inaudible (sometimes referred to as an "ultrasonic chirp") with a frequency above about 18 kHz or above about 20 kHz. The signal comprises data, and the data may identify a location or comprise one or more device identifiers.

In some examples, a control device may be configured to operate with a different networked device by associating the control device with a docking station, and receiving data from the docking station that identifies the networked device. Accordingly, in some examples, a method comprises detecting that the control device is associated with a docking station and while the control device is associated with the docking station, receiving, from the docking station, data associated with a second networked device. In response to (or after) receiving the data, the method comprises configuring the control device to control the second networked device.

In some examples, the playback system comprises a plurality of control devices including a first control device and a second control device. The first control device is configured to control only a first networked device and the second control device can be configured to control the first networked device and a second networked device at different times. For example, at a particular moment in time the second control device may control the networked device that is closest to the second control device. In some examples, by placing the second control device in a first docking station associated with the first networked device, the second control device can be configured to control the first networked device. Similarly, by placing the second control device in a second docking station associated with the second networked device, the second control device can be configured to control the second networked device. The first control device can be considered to be a static control device, because it always controls the same networked device, and the second control device can be considered to be a roaming control device, because it can control the first and/or second networked devices. The first control device may therefore only control the first networked device even if it is placed in the second docking station. The second control device may be associated with the second docking station (and/or second networked device) by default. For example, when the control device is turned on, it may be initially configured to control the second networked device even if it had previously been controlling the first networked device.

In some examples, the control device can be used to group together one or more networked devices (as part of a grouping procedure) by moving the control device throughout the playback environment to group particular devices. Accordingly, a method comprises detecting that the first networked device is within a proximity of the control device and receiving tenth input data, the tenth input data indicative of a command to start a grouping procedure to group the first networked device with at least one other networked device. During the grouping procedure, the method comprises detecting that a second networked device is within a proximity of the control device. The method further comprises receiving eleventh input data, the eleventh input data indicative of a command to end the grouping procedure. After receiving the eleventh input data, the method comprises causing the first and second networked devices to form a group. If the first networked device is initially playing back media content, such as music, the music may, in effect, follow the user as the user carries the control device between the two networked devices.

In some examples, before receiving the tenth input data, the playback device of the first networked device is playing back media content. In response to (or after) grouping the first and second networked devices, the method further comprises causing the second networked device to play back media content in synchrony with the playback device of the first networked device.

In some examples the second networked device comprises a playback device and an illumination device. Accordingly, if the illumination device of the first networked device is outputting light before receiving the tenth input data, then in response to (or after) grouping the first and second networked devices, the illumination device of the second networked device is caused to output light.

In another embodiment, a control device comprises a network interface configured to transmit commands to at least a first networked device, the first networked device comprising a playback device and an illumination device. The control device further comprises at least one input interface configured to generate input data in response to (or after) operation of the at the least one input interface. The control device further comprises a storage and a processing system. The storage comprises non-transitory computer-readable instructions that, when executed by the processing system, instruct the control device to: operate in a first mode and in response to (or after) operation of the at least one input interface, generate first input data, the first input data indicative of a command to control an illumination device of the first networked device. In response to (or after) generating the first input data, the instructions instruct the control device to transmit via the network interface, a command to control the illumination device of the first networked device. The instructions further instruct the control device to: operate in a second mode and in response to (or after) operation of the at least one input interface, generate second input data, the second input data indicative of a command to control a playback device of the first networked device. In response to (or after) generating the second input data, the instructions instruct the control device to transmit via the network interface, a command to control the playback device of the first networked device. The commands transmitted to at least the first networked device may be transmitted directly or indirectly, such as via one or more of a gateway, access point or another networked device.

In further examples, the instructions instruct the control device to perform any or all of the other method steps described above or herein.

In a further embodiment, a control device comprises a network interface configured to transmit commands to at least a first networked device, the first networked device comprising a playback device and an illumination device. The control device further comprises at least one input interface configured to generate input data in response to operation of the at the least one input interface. The control device further comprises a storage and a processing system. The storage comprises non-transitory computer-readable instructions that, when executed by the processing system, instruct the control device to perform any of the method steps described above or herein.

In another embodiment, there is provided a non-transitory computer-readable medium having computer program instructions embodied thereon, wherein the computer program instructions, when executed by a processing system of a control device, instruct the control device to: operate in a first mode and in response to (or after) operation of at least one input interface of the control device, generate first input data, the first input data indicative of a command to control an illumination device of a first networked device. In response to (or after) generating the first input data, the instructions instruct the control device to transmit a command to control the illumination device of the first networked device. The instructions further instruct the control device to: operate in a second mode and in response to (or after) operation of the at least one input interface of the control device, generate second input data, the second input data indicative of a command to control a playback device of the first networked device. In response to (or after) generating the second input data, the instructions instruct the control device to transmit a command to control the playback device of the first networked device.

In some examples, the control device comprises at least one network interface, such as an interface compliant with IEEE 802.15.4, such as ZigBee, or Bluetooth, such as Bluetooth or Bluetooth Low Energy, BLE, to communicate with a networked device via a particular communication protocol. The networked device comprises a corresponding network interface. Commands received by the networked device from the control device can be transmitted to a playback device and/or an illumination device within the networked device so that the commands can be executed. In some examples, the control device comprises two network interfaces and can transmit data to the networked device using at least one of these network interfaces. For example, the networked device may comprise only a single network interface, so the control device selects a corresponding network interface to transmit the data.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100. For example, a user can interact with a control device to cause or instruct a playback device to play back audio.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h, 110i, 110j, and 110k can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
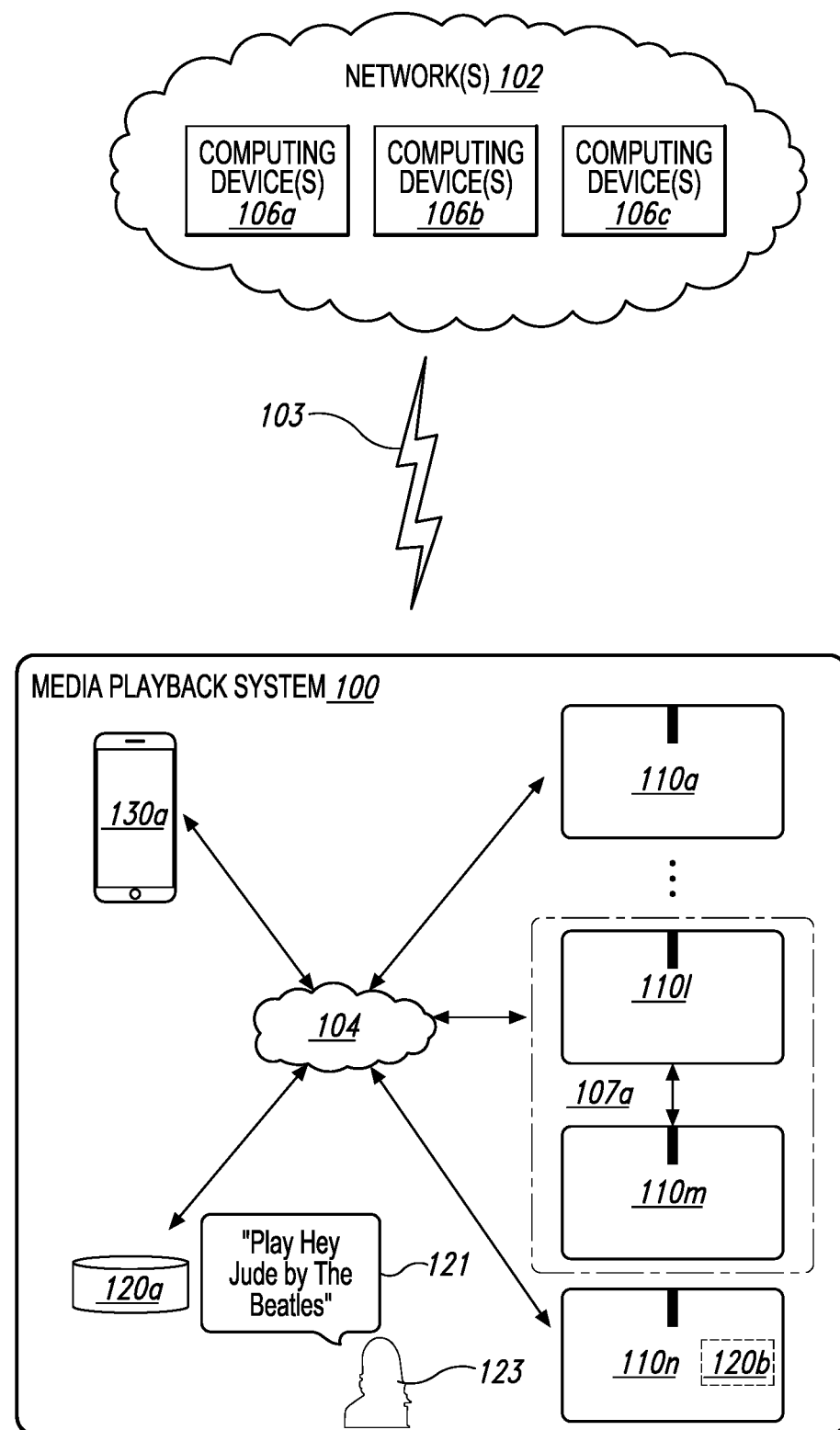
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more) than three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1I through 1M.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
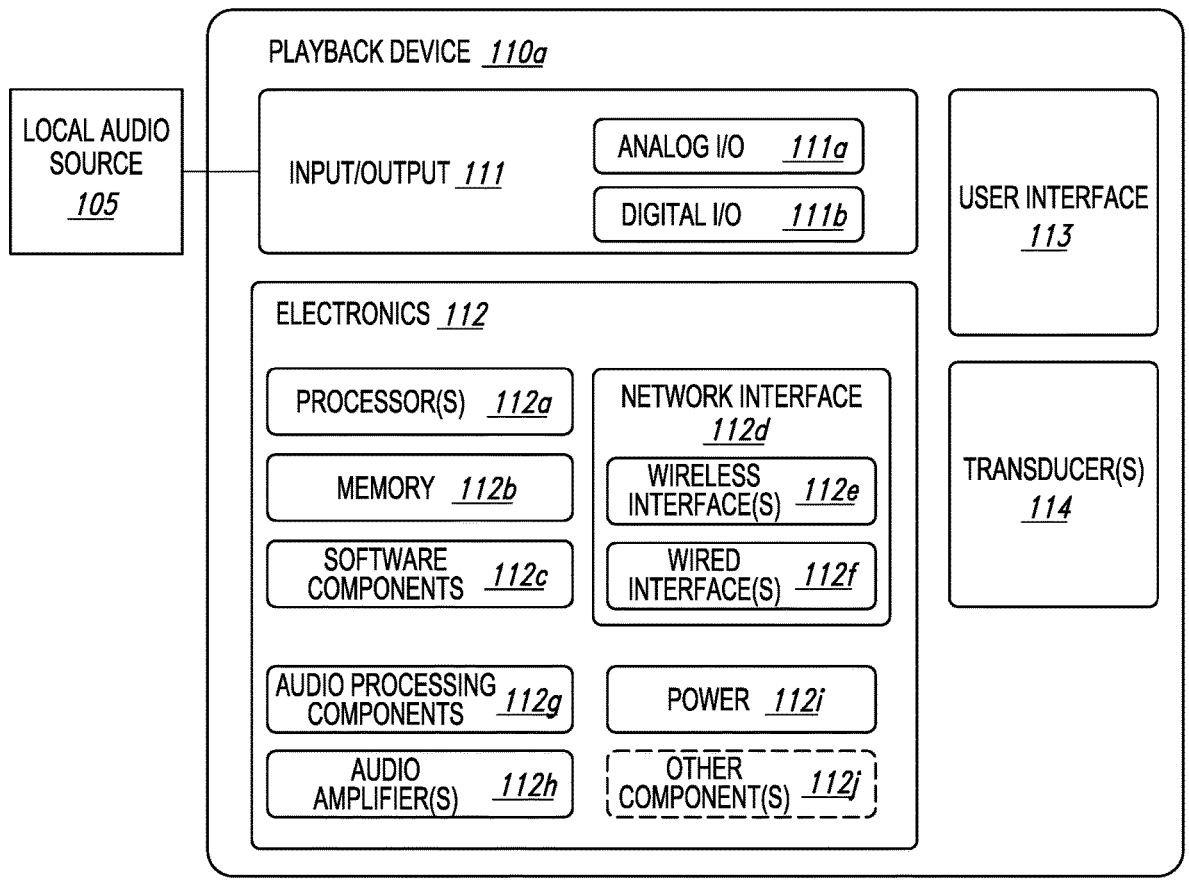
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above. The one or more processors 112a may also be known as a processing system, in some examples.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render, play back, or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein.

Figure 1D:
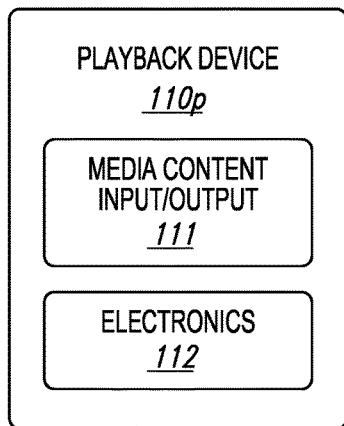
FIG. 1D is a block diagram of a playback device.

Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
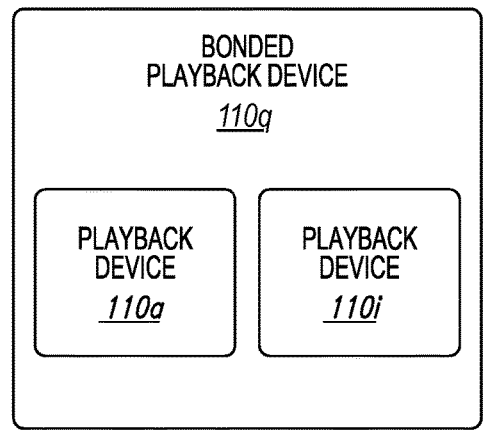
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1M:
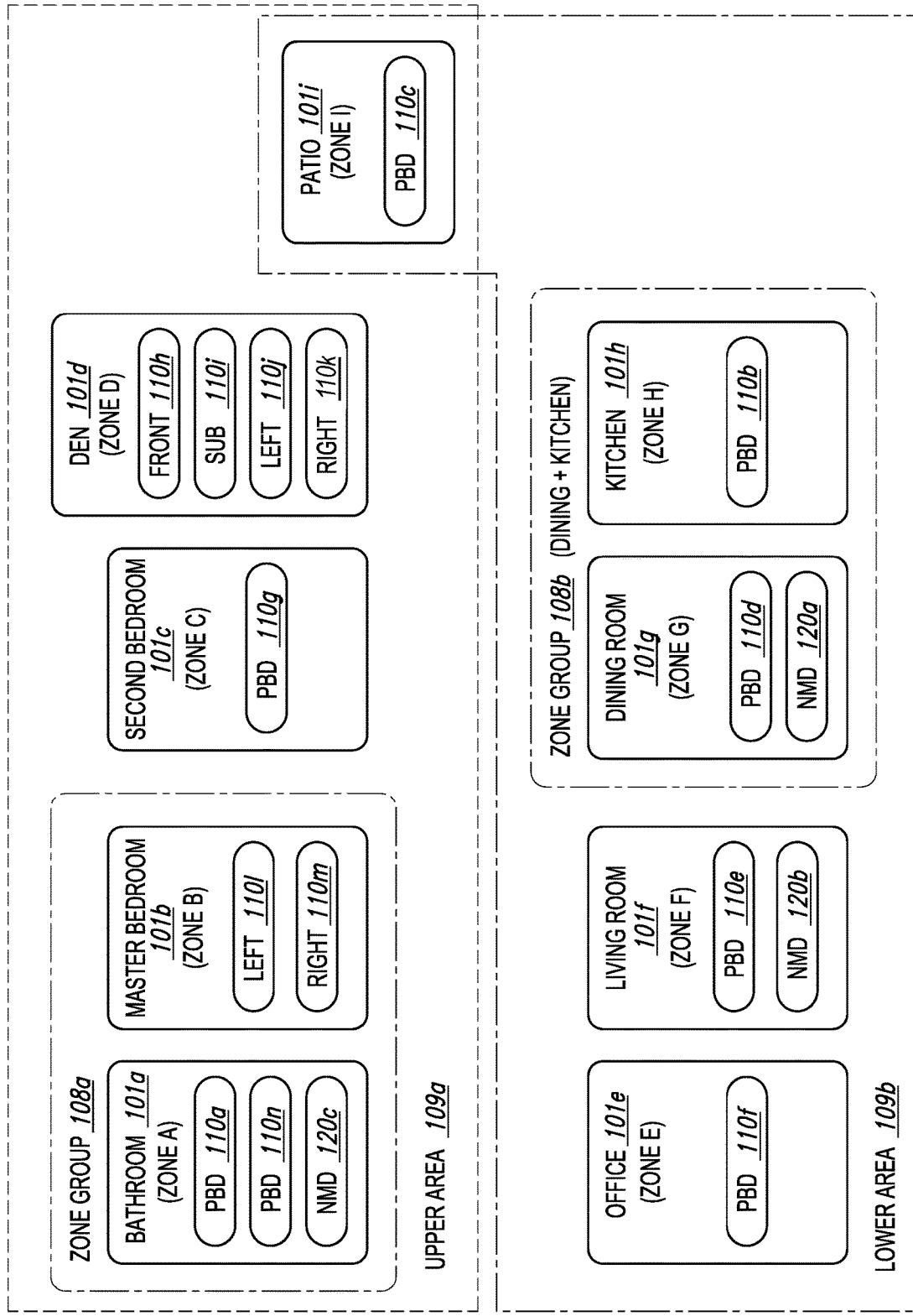
FIG. 1M is a schematic diagram of media playback system areas.

FIGS. 1I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*a* and 110*n* can be merged to form a merged group or a zone group 108*b*. The merged playback devices 110*a* and 110*n* may not be specifically assigned different playback responsibilities. That is, the merged playback devices 110*a* and 110*n* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1I, the playback devices 110*l* and 110*m* may be bonded so as to produce or enhance a stereo effect of audio content. In this example, the playback device 110*l* may be configured to play a left channel audio component, while the playback device 110*m* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Methods and Devices for Rejoining a Group

Ceiling Speaker

Figure 2:
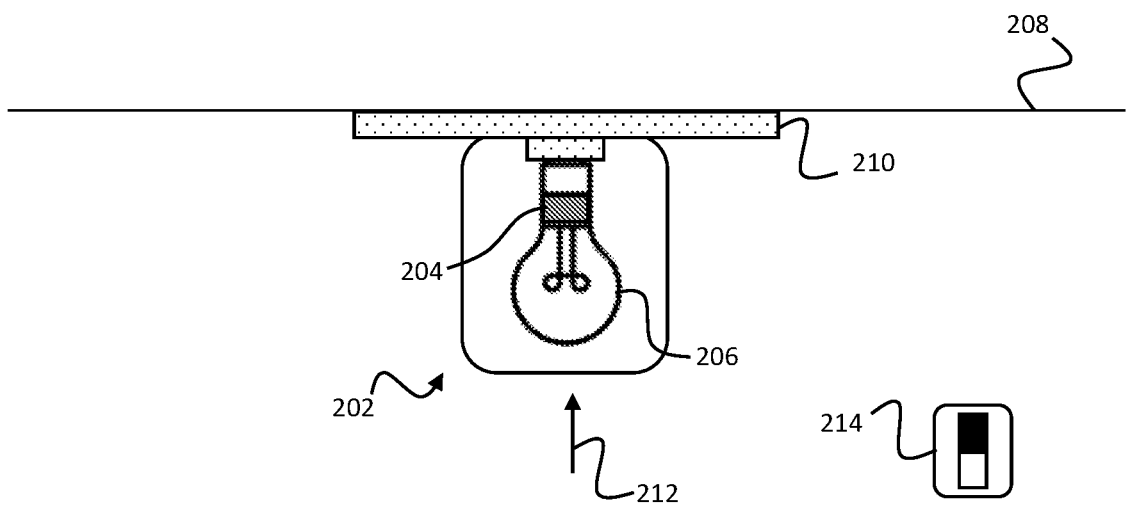
FIG. 2 is a cross sectional view of a ceiling speaker.

FIG. 2 is a cross sectional view of a ceiling speaker 202 comprising a playback device 204. The ceiling speaker 202 can be in the form of a combined light 206 or lighting element and speaker that can be screwed in or attached to an existing socket (e.g., E26, E27, A15, etc.). As another example, the ceiling speaker 202 can be fixed to a ceiling 208 via a fastener (such as a screw), may be mounted within a cavity of the ceiling 208 itself and/or may mounted to a light fitting, such as a bayonet, screw or pin light fitting. In this example, the ceiling speaker 202 further comprises an illumination device 206, such as a light. The ceiling speaker 202 therefore has dual functionality—to output audio via the playback device 204, and to illuminate a room or location via the illumination device 206. The ceiling speaker 202 may also be known as a networked device.

The ceiling speaker 202 can have a speaker grille 204 (which forms part of the playback device 204) and a light or lighting element 206 (which forms part of the illumination device 206). Both the speaker grille 204 and light 206 are connected to a main body 210 (e.g., socket or mounting surface for fixing to a wall or ceiling) of the ceiling speaker 202. The main body 210 houses components of the playback device 204 (which includes any or all of the components described in FIG. 1C, 1D, 1F or 1G), and the illumination device 206. For example, the components (e.g., transducers, electronics 112) of the playback device 204 may be housed together or separately. It will be appreciated that in other examples, the speaker grille 204 and light 206 may take different forms and/or are arranged differently. The ceiling speaker 202 may also be known as a ceiling unit or speaker unit or light unit or ceiling light, in certain examples.

FIG. 2 also depicts a remote 214, separate to (i.e., arranged remotely from) the ceiling speaker 202. The remote 214 (also known as a control device or a remote device or a remote-control device) is communicatively coupled to the ceiling speaker 202 (and therefore also the playback device 204 and illumination device 206). The remote 214 may comprise one or more input interfaces, such as buttons, knobs, dials, touch-sensitive surfaces, displays, or touchscreens, for example.

A user can provide an input to the remote 214 to control the ceiling speaker 202. For example, a user can operate the remote 214 to turn on and off the playback device 204 and/or the illumination device 206, control playback of media content on the playback device 204 (such as play, skip, back, pause, volume etc.), and control aspects of the illumination device 206 (such as brightness of the light, colour of the light, warmth of the light etc.).

Figure 3A:
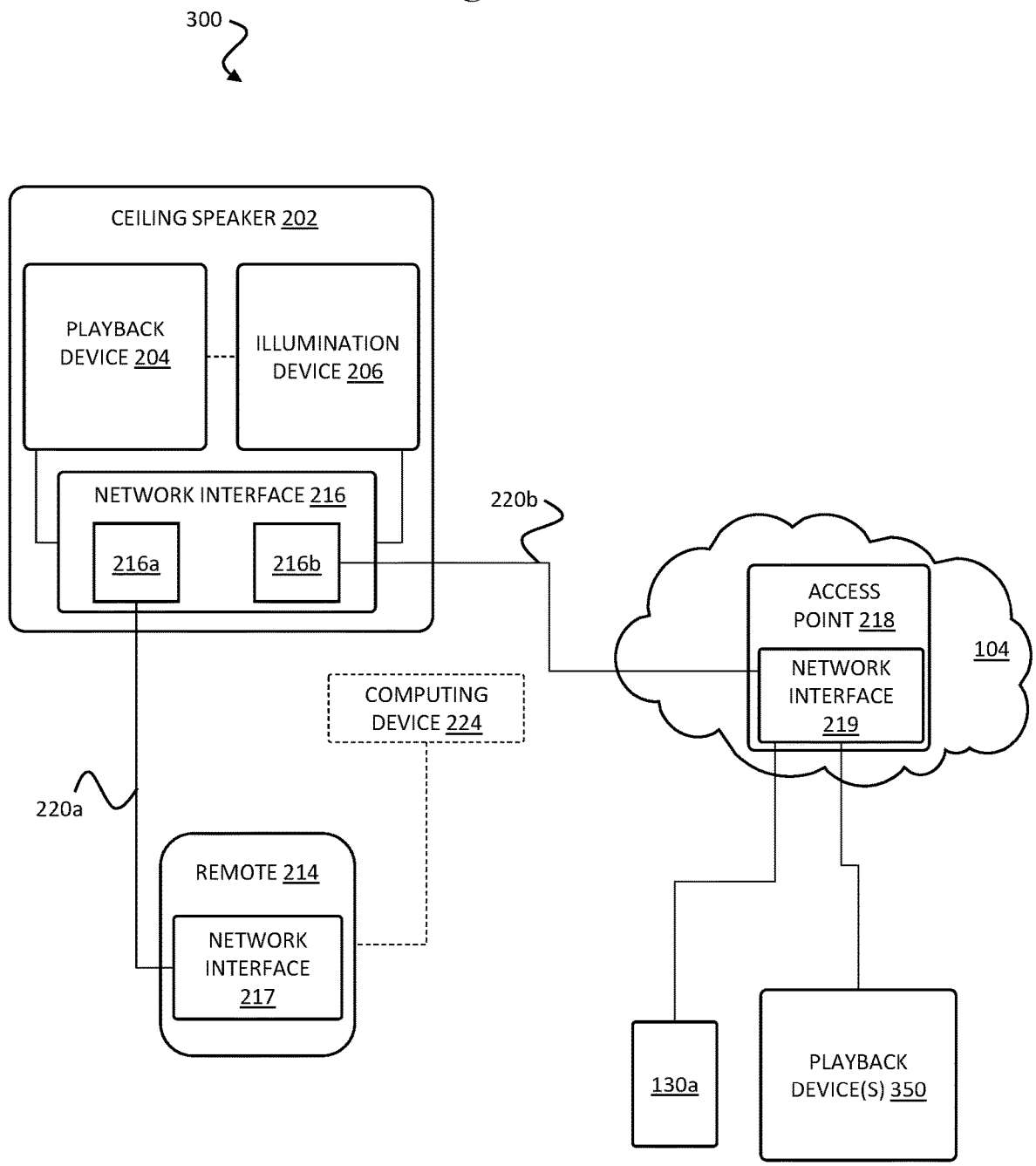
FIGS. 3A-3C are block diagrams of portions of a media playback system according to a examples.
Figure 3B:
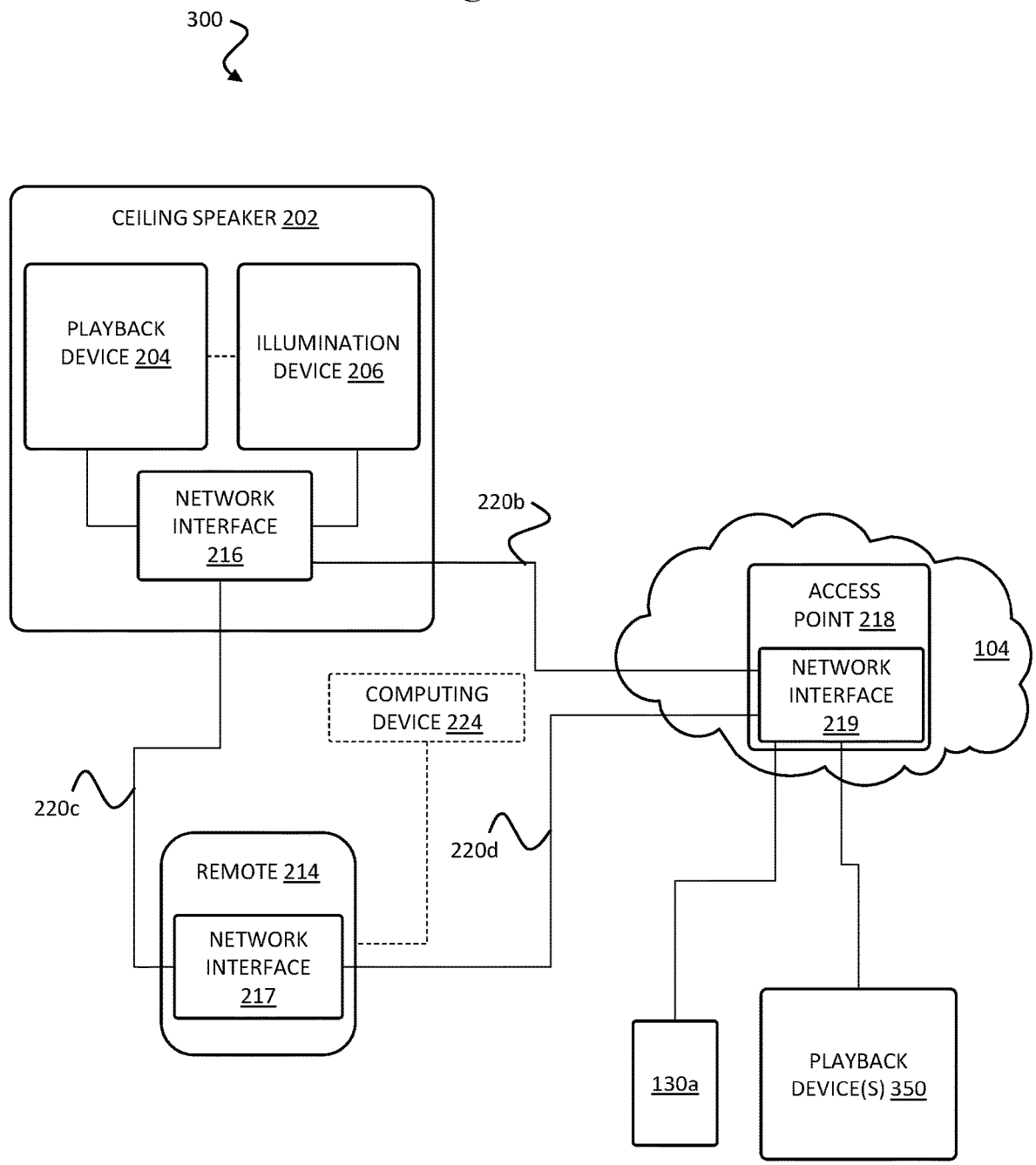
Figure 3C:
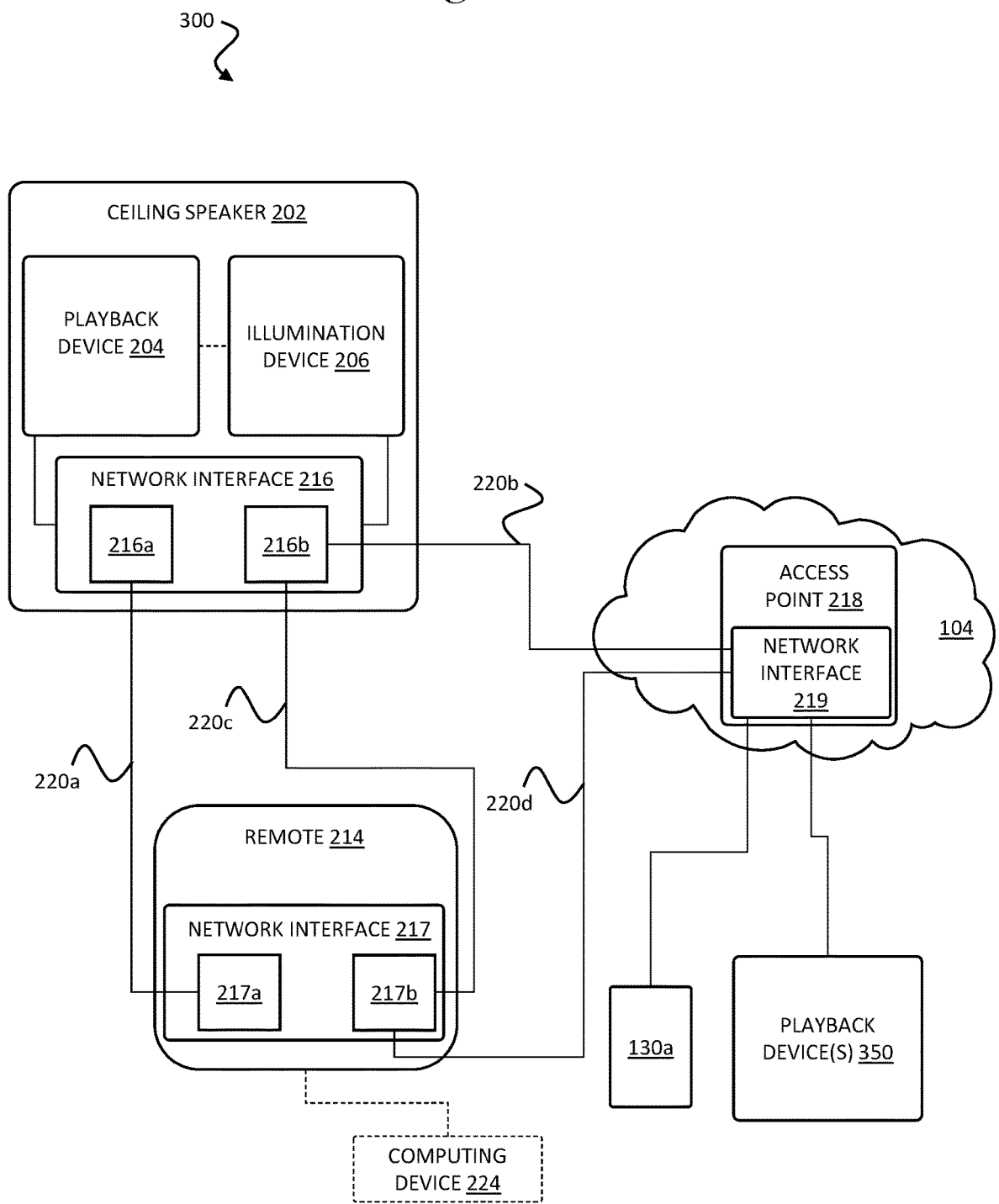

FIGS. 3A, 3B, and 3C are schematic diagrams of at least a portion of a media playback system 300, comprising the ceiling speaker 202, the remote 214, a network 104, a control device 130a, and one or more additional playback devices. In these examples, the one or more additional playback devices comprise a second playback device 350. In these examples, the remote 214 is a dedicated control device configured for use with a playback system comprising the ceiling speaker 202, whereas the control device 130a is a multifunctional device (such as a smartphone or tablet device). For example, the remote 214 may comprise hardware and/or software dedicated to controlling the playback system, whereas the control device 130a comprises a software application to control the playback system, as well as software for other purposes. In some examples, both the remote 214 and the control device 130a can control the ceiling speaker 202.

In each of FIGS. 3A-3C, the ceiling speaker 202 comprises a network interface 216 to facilitate the transmission of data between the ceiling speaker 202 and one or more other devices on the data network 104 (e.g., one or more of the other playback devices 350, the remote 214, the control device 130a, a gateway, and/or an access point (such as router 218)). The network interface 216 may be part of the ceiling speaker 202, and/or may be fully or partially integrated with the playback device 204 and/or illumination device 206. In some examples (such as in FIGS. 3A and 3C), the ceiling speaker 202 comprises a first network interface to communicate with the remote 214 (either directly or indirectly via a gateway for example), and a second network interface to communicate with other devices in the playback system. The first network interface may be part of the ceiling speaker 202, and the second network interface may be integrated with the playback device 204. The network interface 216 (or the first network interface) may be communicatively coupled to the playback device 204 and/or illumination device 206 by a system bus, such as an Inter-Integrated Circuit (I²C bus).

The network interface 216 comprises one or more interfaces, which may be wired and/or wireless interfaces. A wireless interface (e.g., an interface comprising one or more antennae) can be configured to wirelessly communicate with one or more other devices that are communicatively coupled to the network 104 in accordance with one or more wireless communication protocols (e.g., WiFi, Bluetooth (including Bluetooth Low Energy (BLE)), Cellular, such as 3G, 4G, LTE, 5G, 802.15.4, ZigBee, etc.). A wired interface (e.g., an interface or receptacle configured to receive a network cable) can communicate over a wired connection with the other devices in accordance with one or more wired communication protocols (such as an Ethernet, USB, Thunderbolt, etc.).

The remote 214 also comprises a network interface 217 to facilitate the transmission of data between the remote 214 and one or more other devices on the data network 104 (e.g., one or more of the other playback devices 350, the ceiling speaker 202, the control device 130a, a gateway and/or an access point (such as router 218)). The network interface 217 of the remote 214 comprises one or more interfaces, which may be wired and/or wireless interfaces.

FIGS. 3A-3C further depict an access point 218 through which data communications can be routed. The network 104 may comprise one or more access points 218 to facilitate communication between different devices. In a particular example, the access point 218 has a network interface 219 comprising a wireless interface (such as a WiFi interface). Thus, WiFi devices with corresponding wireless interfaces can communicate via the access point 218.

FIGS. 3A-3C show various communication links 220 between the devices in the network 104. As mentioned, these communication links 220 may be wireless and/or wired. Various example implementations are envisaged, and are described below.

First Example

In a first example (shown in FIG. 3A), the network interface 217 of the remote 214 comprises a single wireless interface 217 (such as a Bluetooth or ZigBee interface), the network interface 219 of the access point 218 comprises a different single wireless interface 219 (such as a WiFi interface) and the network interface 216 of the ceiling speaker 202 comprises two wireless interfaces 216a, 216b (such as a Bluetooth or ZigBee interface 216a to correspond to the wireless interface 217 of the remote 214, and a WiFi interface 216b to correspond to the wireless interface 219 of the access point 218). The remote 214 therefore operates on a first wireless protocol (such as the Bluetooth or ZigBee wireless protocol) and the access point 218 operates on a second wireless protocol (i.e. WiFi). The ceiling speaker 202 operates on both the first wireless protocol (such as the Bluetooth or ZigBee wireless protocol) and the second wireless protocol (i.e. WiFi). Accordingly, in this example, the remote 214 can communicate directly with the ceiling speaker 202 via the first wireless protocol (along communication link 220a), the ceiling speaker 202 can communicate directly with the access point 218 via the second wireless protocol (along communication link 220b), and the remote 214 cannot communicate directly with the access point 218 via either the first or second wireless protocol. In this example, the control device 130a and the other playback devices 350 can communicate directly with the access point via the second wireless protocol.

Data can therefore be transmitted between the ceiling speaker 202 and the control device 130a and/or the other playback devices 350 via the second wireless protocol. Data can also be transmitted between the ceiling speaker 202 and the remote 214 via the first wireless protocol. In some examples, the ceiling speaker 202 receives instructions/commands from the remote 214 via the first wireless protocol and transmits corresponding or associated commands to other devices via the second wireless protocol. Accordingly, the ceiling speaker 202 may act as a gateway between different protocols and/or networks.

In an example scenario, a user wishes to use the remote 214 to control the playback device 204 and illumination device 206 of the ceiling speaker 202. The user operates a particular button on the remote 214 and a command is transmitted from the Bluetooth interface 217 of the remote 214 to the Bluetooth interface 216a of the ceiling speaker 202 via the first wireless protocol. On receipt of the command, the playback device 204 starts playing back media content. The user then operates a particular button on the remote 214 and another command is transmitted from the Bluetooth interface 217 of the remote to the Bluetooth interface 216a of the ceiling speaker 202 via the first wireless protocol. On receipt of the command, the illumination device 206 outputs light.

Second Example

In a second example (shown in FIG. 3B), the network interface 217 of the remote 214 comprises a single wireless interface 217 (such as a WiFi interface), the network interface 219 of the access point 218 comprises a corresponding wireless interface 219 (such as a WiFi interface) and the network interface 216 of ceiling speaker 202 comprises a corresponding wireless interface 216 (such as a WiFi interface). The remote 214, the access point 218 and the ceiling speaker therefore all operate on the same (second) wireless protocol. Accordingly, in this example, the remote 214 can communicate directly with the ceiling speaker 202 using the second wireless protocol (along communication link 220c), or indirectly via the access point 218 using the second wireless protocol (along communication links 220*d* and 220*b*). In some examples, communication link 220*c* is not operative.

Third Example

In a third example (shown in FIG. 3C), the network interface 217 of the remote 214 comprises two wireless interfaces 217*a*, 217*b* (such as a Bluetooth or ZigBee interface 217*a* and a WiFi interface 217*b*), the network interface 219 of the access point 218 comprises a single wireless interface 219 (such as a WiFi interface) and the network interface 216 of ceiling speaker 202 comprises two wireless interfaces 216*a*, 216*b* (such as a Bluetooth or ZigBee interface 216*a* and a WiFi interface 216*b*). The remote 214 and ceiling speaker 202 therefore both operate on the first and second wireless protocols and the access point 218 operates on the second wireless protocol. Accordingly, in this example, the remote 214 can communicate directly with the ceiling speaker 202 via the first or second wireless protocol (along communication links 220*a*, 220*c*, respectively), or indirectly via the access point 218 using the second wireless protocol (along communication links 220*d* and 220*b*). The remote 214 can switch between the two interfaces 217*a*, 217*b* (and therefore the first and second protocols) based on various use cases. For example, some ceiling speakers and/or playback devices may only comprise a single wireless interface for communication with the remote. In some examples, communication link 220*c* is not operative.

Gateway Device

Figure 4A:
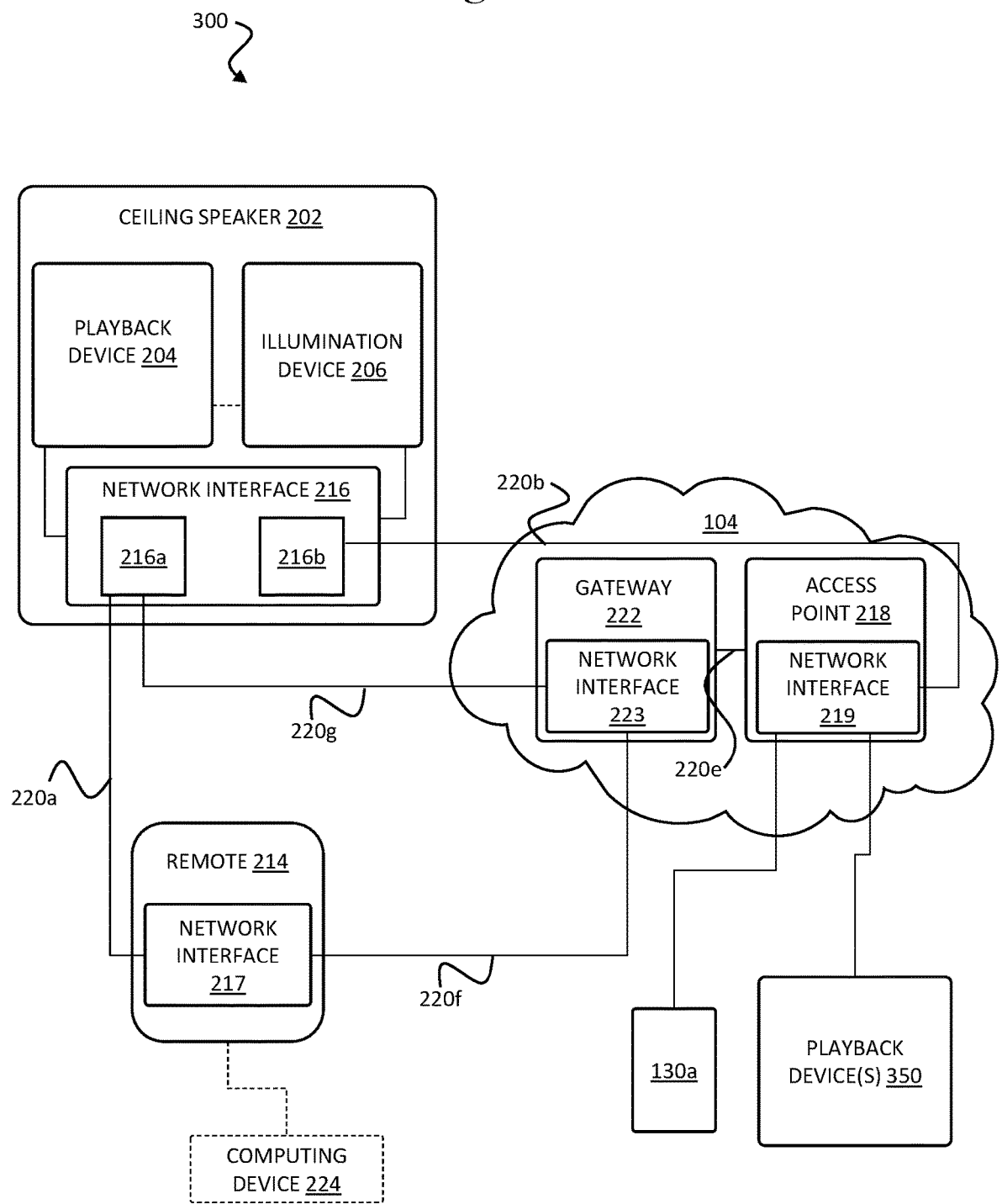
FIGS. 4A-4B are block diagrams of portions of a media playback system according to examples.
Figure 4B:
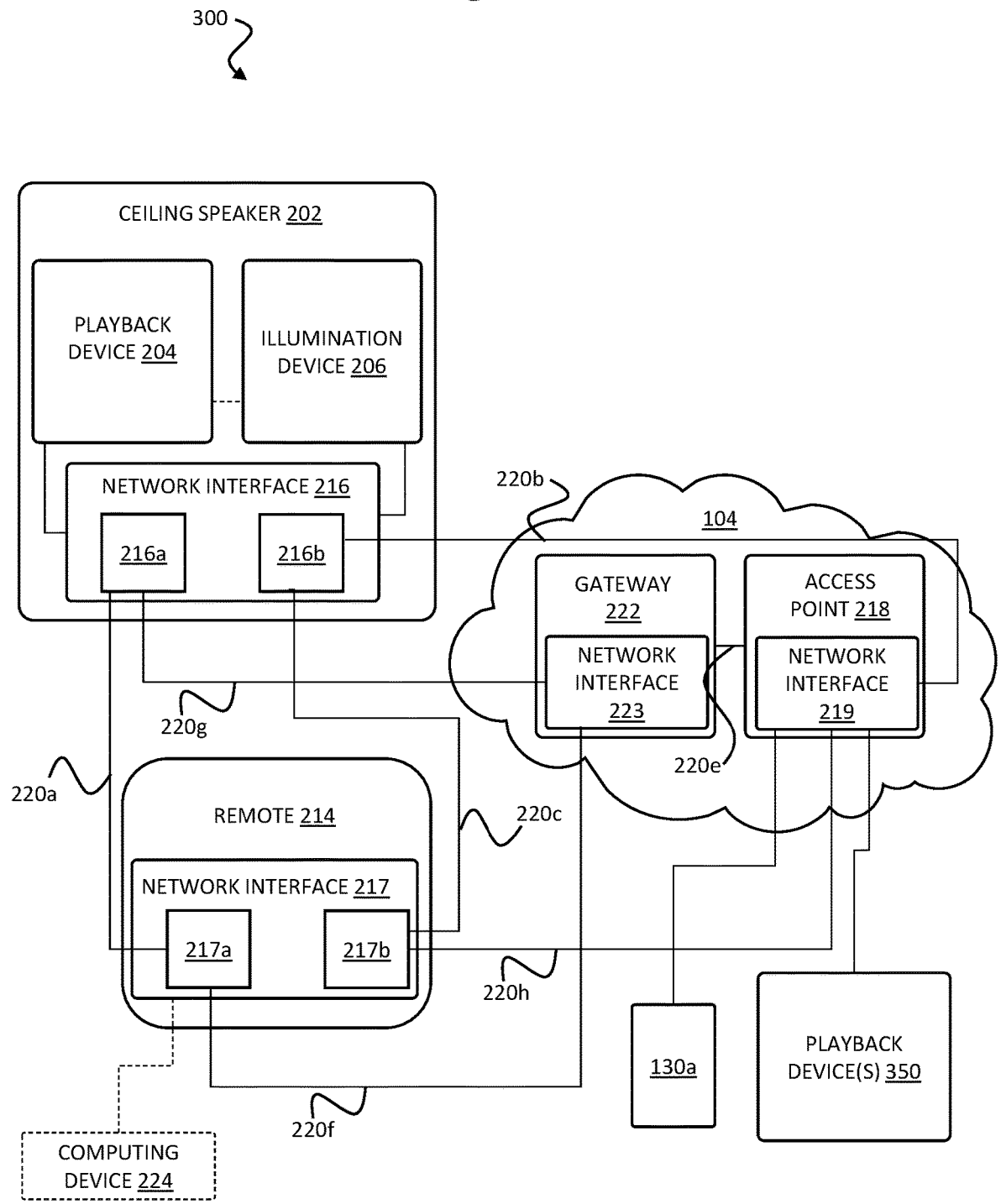

FIGS. 4A and 4B are schematic diagrams of alternative arrangements of the media playback systems 300 of FIGS. 3A-C. In contrast to FIGS. 3A-3C, the playback systems further comprise a gateway 222 (or hub) which communicatively couple the remote 214 and the ceiling speaker 202, either directly or via the access point 218.

As in FIGS. 3A-3C, the ceiling speaker 202 comprises a network interface 216 to facilitate the transmission of data between the ceiling speaker 202 and one or more other devices on the data network 104 (e.g., one or more of the other playback devices 350, the remote 214, the control device 130*a*, the gateway 222, and/or an access point (such as router 218)). Similarly, the remote 214 also comprises a network interface 217 to facilitate the transmission of data between the remote 214 and one or more other devices on the data network 104 (e.g., one or more of the other playback devices 350, the ceiling speaker 202, the control device 130*a*, the gateway 222 and/or an access point (such as router 218)).

In some examples, the router 214 and gateway 222 are communicatively coupled (such as via a direct communication link 220*e*). This allows the gateway 222 to receive data from a first device (such as the remote 214) via the first protocol (such as the Bluetooth or ZigBee protocol), transmit this data to the access point 218 via the communication link 220*e*, and from here the access point 218 transmits this data to a second device (such as the ceiling speaker 202) via the second protocol (such as the WiFi protocol). Similarly, this allows the access point 218 to receive data from a first device (such as the control device 130*a*) via the second protocol (such as the WiFi protocol), transmit this to the gateway 222 via communication link 220*e*, and the gateway 222 then transmits this data to a second device (such as the ceiling speaker 202) via the first protocol (such as the Bluetooth or ZigBee protocol). The gateway 222 can therefore act as a translator between different protocols.

In other examples, the router 214 and gateway 222 are not communicatively coupled via communication link 220*e*. In some examples, the gateway 222 receives and transmits data using a single protocol (such as the Bluetooth or ZigBee protocol).

FIGS. 4A and 4B show various communication links 220 between the devices in the network 104. These communication links 220 may be wireless and/or wired. Various example implementations are envisaged, and are described below. In any of the examples described below, although not explicitly stated, the gateway 222 and access point 218 may each comprise an additional corresponding network interface (not shown), such a wired interface, to provide communications via the communication link 220*e*. The communication link 220*e* may provide communications via a third protocol, such as Ethernet.

Fourth Example

In a fourth example (shown in FIG. 4A), the remote 214 comprises a single wireless interface 217 (such as a Bluetooth or ZigBee interface), the gateway 222 comprises a corresponding wireless interface 223 (such as a Bluetooth or ZigBee interface), the access point 218 comprises a different wireless interface 219 (such as a WiFi interface), and the network interface 216 of ceiling speaker 202 comprises two wireless interfaces 216*a*, 216*b* (such as a Bluetooth or ZigBee interface 216*a* to correspond to the wireless interfaces 217, 223 of the remote 214 and gateway 222, and a WiFi interface 216*b* to correspond to the wireless interface 219 of the access point 218). The remote 214 and gateway 222 therefore operate on the first wireless protocol (such as the Bluetooth or ZigBee wireless protocol) and the access point 218 operates on the second wireless protocol (i.e. WiFi). The ceiling speaker 202 operates on both the first wireless protocol (such as the Bluetooth or ZigBee wireless protocol) and the second wireless protocol (i.e. WiFi). Accordingly, in this example, the remote 214 can communicate directly with the ceiling speaker 202 via the first wireless protocol (along communication link 220*a*) or indirectly via the gateway 222 using the first wireless protocol (along communication links 220*f* and 220*g*) or indirectly via the gateway 222 and access point 218 using at least the first and second wireless protocols (along communication links 220*f*, 220*e* and 220*b*). The ceiling speaker 202 can communicate directly with the access point 218 via the second wireless protocol (along communication link 220*b*), and the remote 214 cannot communicate directly with the access point 218 via either the first or second wireless protocol. In this example, the control device 130*a* and the other playback devices 350 can communicate directly with the access point 218 via the second wireless protocol.

In some examples, communication link 220*e* is not operative. In some examples, communication link 220*a* is not operative. In some examples, both communication links 220*e* and 220*a* are not operative.

Fifth Example

In a fifth example (shown in FIG. 4B), the network interface 217 of the remote 214 comprises two wireless interfaces 217*a*, 217*b* (such as a Bluetooth or ZigBee interface 217*a* and a WiFi interface 217*b*), the gateway 222 comprises a wireless interface 223 (such as a Bluetooth or ZigBee interface), the access point 218 comprises a wireless interface 219 (such as a WiFi interface) and the network interface 216 of the ceiling speaker 202 comprises two wireless interfaces 216a, 216b (such as a Bluetooth or ZigBee interface 216a and a WiFi interface 216b). The remote 214 and ceiling speaker 202 therefore both operate on the first and second wireless protocols, the gateway 222 operates on the first wireless protocol, and the access point 218 operates on the second wireless protocol. Accordingly, in this example, the remote 214 can communicate directly with the ceiling speaker 202 via the first or second wireless protocols (along communication links 220a or 220c, respectively), or indirectly via the access point 218 using the second wireless protocol (along communication links 220h and 220b), or indirectly via the gateway 222 using the first wireless protocol (along communication links 220f and 220g) or indirectly via the gateway 222 and access point 218 using at least the first and second wireless protocols (along communication links 220f, 220e and 220b). The remote 214 can switch between the two interfaces 217a, 217b (and therefore the first and second protocols) based on various use cases. For example, some ceiling speakers and/or playback devices may only comprise a single wireless interface for communication with the remote 214.

In some examples, communication link 220e is not operative. In some examples, communication link 220a is not operative. In some examples, communication link 220c is not operative. In some examples, all communication links 220e, 220c and 220a are not operative.

As mentioned above, when the user operates a particular button on the remote 214, a command is transmitted from the remote 214 to another device on the network 104. In some examples, commands are targeted and addressed to a particular device, such as the ceiling speaker 202. In other examples however, a command may be targeted and addressed to more than one device, such as two or more ceiling speakers. Commands may therefore be broadcast or multicast to a plurality of devices within the playback system.

Location-Aware Remote

In some examples, the remote 214, and/or one or more other devices associated with the playback system, maintain an awareness of where the remote 214 is located within the playback system/environment. This allows the remote 214 to control one or more particular devices based on the location of the remote 214 at any given time. For example, if the remote 214 is detected to be near to a first ceiling speaker, user input to the remote 214 controls operation of at least the first ceiling speaker. If a user moves the remote 214 to a different location (such as a different location within the same room, or a different room), it can be detected that the remote 214 is near to a second ceiling speaker. Accordingly, user input to the remote 214 may therefore control operation of at least the second ceiling speaker.

In some examples, maintaining an awareness of where the remote 214 is located comprises storing data indicative of a location of the remote (in one or more state variables, for example). The location data may be stored in memory of the remote itself, or in memory of another device, such as a networked device, control device or a remote server. In another example, maintaining an awareness of where the remote 214 is located comprises storing an association between the remote and one or more devices within the playback system (in one or more state variables, for examples). The location of the remote may therefore be determined by reference to one or more associated devices. For example, a state variable may store an association between the remote and a first networked device. It may therefore be inferred that the remote is located within a proximity of the first networked device.

FIG. 5 depicts at least part of a playback system comprising a plurality of networked devices, including a first networked device 402, a second networked device 404, a third networked device 406 and a fourth networked device 408. In this example, each of the networked devices comprise a playback device and an illumination device. In other examples, some or all of the networked devices 402-408 comprise only a playback device. Although the networked devices 402-408 are depicted as ceiling speakers, they may be freestanding, such as table-top, or wall-mounted devices. Some or all of networked devices 402-408 may be "standard" playback devices and may be located anywhere within a room. In further examples, some or all of the networked devices 402-408 comprise only an illumination device. The networked devices 402-408 function in the same way as the example ceiling speakers described above in FIGS. 2-4B.

FIG. 5 also depicts a remote 414 that can be moved throughout the playback environment between different locations. The remote 414 functions in the same way as the example remotes described above in FIGS. 2-4B. FIG. 5 shows the remote located in 4 different locations (locations 1-4).

The playback environment of this example comprises 3 rooms, including a first room 416, a second room 418 and a third room 420. The rooms are separated by physical or virtual partitions 422, for example the partitions 422 may be a wall or may simply demarcate or divide areas of a larger, open-plan space. The first networked device 402 is located in the first room 416, the second and third networked devices 404, 406 are located in the second room 416, and the third networked device 408 is located in the third room 420. Location 1 is within the first room 416, locations 2 and 3 are within the second room 418, and location 4 is within the third room 420.

In an example scenario, the remote 414 is initially located in the first room 416 at location 1. As a result, it is detected that the first networked device 402 is within a proximity of the remote 414. For example, the remote 414 or another device may determine that the remote 414 is located "near" or "close" to the first networked device 402 (such as within a particular threshold distance of the first networked device 402) and/or that that the remote 414 is nearer to the first networked device 402 than any of the other networked devices within the playback system.

After detecting that the first networked device 402 is within a proximity of the remote 414, the remote 414 is configured to control the first networked device 402 (whether that be the first networked device as a whole, the playback device of the first networked device or the illumination device of the first networked device). Configuring the remote to control the first networked device 402 comprises associating input data (which is generated when a user operates the remote 414) with commands for the first networked device 402. Thus, as a user operates the remote 414, the generated input data comprises one or more commands for the first networked device 402. For example, a user may press a particular button on the remote 414, which generates input data indicative of a command to control the playback device of the first networked device 402. The command may be to "pause" playback of a currently playing media item that is being played back by the playback device of the first networked device. The command is then transmitted to the first networked device 402 (via any of the methods described in FIGS. 3 and 4) which executes the command (i.e. the playback device pauses playback). Similarly, a user may press a particular button on the remote 414, which generates input data indicative of a command to control the illumination device of the first networked device 402. The command may be to "turn on" the illumination device the first networked device. The command is then transmitted to the first networked device 402 (via any of the methods described in FIGS. 3 and 4) which executes the command (i.e. the illumination device turns on). Accordingly, in response to (or after) the input data, the first networked device (and therefore the playback device and/or illumination device) can be controlled.

At a later moment in time, the user carries the remote 414 into the second room 418 to location 2. As a result, it is detected that the second networked device 404 is within a proximity of the remote 414. In some examples, it is further detected or inferred that the first networked device 402 is no longer within a proximity of the remote 414. After detecting that the second networked device 404 is within a proximity of the remote 414, the remote 414 is configured to control the second networked device 404. Accordingly, a user may operate the remote 414 to control the illumination device and/or playback device of the second networked device 404. In some examples, configuring the remote 414 to control the second networked device 404 also comprises stopping control of the first networked device 402. Thus, in certain examples, operation of the remote 414 no longer controls the first networked device 402.

In some examples, networked devices can be grouped together to form "networked zones". For example, if a networked zone comprises two networked devices, each having an illumination device and a playback device, then the networked devices in that group can all be controlled at the same time. For example, the networked devices in the networked zones can play back audio synchronously with each other. User input indicative of a command to control a playback device would control all playback devices within the networked zone, and user input indicative of a command to control an illumination device would control all illumination devices within the networked zone.

In a particular example, the second and third networked devices 404, 406 are grouped together as part of a first networked zone. Accordingly, in some examples, after determining that the second networked device 404 is within a proximity of the remote 414, it is determined that the second networked device 404 forms part of a first networked zone, and that the first networked zone comprises the second networked device 404 and the third networked device 406. In some examples, it is also determined that the third networked device 406 is within a proximity of the remote 414.

In one example, one or more state variables identify the networked devices as members of a particular networked zone group, such as "Networked Group 1" or a "Living Room Network Group". The state variable may be stored in memory of any or all of the networked devices within the group and/or within memory of any or all of any other devices within the playback system. The state variable may additionally or alternatively be stored in memory of the remote 414 and/or a control device 130a and/or in memory of one or more computing devices 106 in a cloud network 102. State variables can be transmitted periodically between various devices via network interfaces. Accordingly, members of the networked zone can be identified by retrieving one or more state variables. One or more state variables may be received by the remote 414 from the second and/or third networked devices 404, 406.

As mentioned, when it is determined that the second networked device 404 forms part of the first networked zone, input data may therefore be indicative of a command to control all networked devices within the first networked zone. The remote 414 is therefore configured to control all networked devices within the first networked zone (i.e. the second networked device 404 and the third networked device 406). Thus, as a user operates the remote 414, the generated input data comprises one or more commands for the second networked device 404 and the third networked device 406. For example, a user may press a particular button on the remote 414, which generates input data indicative of a command to control the playback devices of the second and third networked devices 404, 406. The command may be to "pause" playback of a currently playing media item that is being played back. The command is then transmitted to the second networked device 404 (via any of the methods described in FIGS. 3 and 4) which executes the command (i.e. the playback device pauses playback). The command is also transmitted to the third networked device 406 which executes the command (i.e. the playback device pauses playback).

Similarly, a user may press a particular button on the remote 414, which generates input data indicative of a command to control the illumination devices of the second and third networked devices 404, 406. The command may be to "turn on" the illumination devices. The command is then transmitted to the second networked device 404 (via any of the methods described in FIGS. 3 and 4) which executes the command (i.e. the illumination device turns on). The command is also transmitted to the third networked device 406 which executes the command (i.e. the illumination device turns on). The commands for the third networked device 406 may be transmitted directly or via the second networked device 404, in some examples.

Accordingly, in response to (or after) the input data, the networked devices within a networked zone can be controlled.

In another example, if it is determined that the second networked device 404 and the third networked device 406 are both within a proximity of the remote 414, but it is determined that the second networked device 404 and the third networked device 406 are not grouped together in a networked zone, then the default behavior of the remote 414 may be to control the illumination devices of all "nearby" (ungrouped) networked devices, but not the playback devices of nearby (ungrouped) networked devices. The remote 414 may therefore only control one of the playback devices of the nearby (ungrouped) networked devices, such as the closest playback device. Accordingly, when the remote is located at position 2, input data to the remote 414 may therefore be indicative of a command to control the playback device of the second networked device 404, but not the playback device of the third networked device 406. Thus, as a user operates the remote 414, the generated input data comprises one or more commands to control the playback device of the second networked device 404. For example, a user may press a particular button on the remote 414, which generates input data indicative of a command to control the playback device of the second networked device 404. The command may be to "play" or "resume" playback of a media item. The command is then transmitted to the second networked device 404 (via any of the methods described in FIGS. 3 and 4) which executes the command (i.e. the playback device plays back the media content). The playback device of the third networked device 406 does not execute the command because it is part of a different zone. In contrast, when a user presses a particular button on the remote 414, the remote 414 generates input data indicative of a command to control the illumination devices of both the second and third networked devices 404, 406. The command may be to "turn on" the illumination devices. The command is then transmitted to the second networked device 404 (via any of the methods described in FIGS. 3 and 4) which executes the command (i.e. the illumination device turns on). The command is also transmitted to the third networked device 406 which executes the command (i.e. the illumination device turns on). The command for the third networked device 406 may be transmitted via the second networked device 404, in some examples. If the user were to move the remote 414 to location 3, it may be determined that the third networked device 406 is now closer than the second networked device 404, and so the remote 414 is instead configured to control the playback device of the third networked device 406. Accordingly, when the remote is located at position 3, input data to the remote 414 may therefore be indicative of a command to control the playback device of the third networked device 406, but not the playback device of the second networked device 404.

In some examples, determining that the second networked device 404 and the third networked device 406 are not grouped together in a networked zone, may further comprise determining that the second networked device 404 and the third networked device 406 are located in the same room or area. As above, this may be determined via the use of a "Room/Area" state variable. Accordingly, the above behavior (i.e. controlling individual playback devices and multiple illumination devices) may occur in response to (or after) determining that two or more networked devices are not grouped in a networked zone and are located in the same room or area. The remote 414 may determine that a particular device (such as the third networked device 406) is within the same room or area as the second networked device 404 even without detecting that the third networked device is within a proximity of the remote 414, through the use of state variables, for example. Thus, in some examples, the above behavior can occur after only detecting that the remote is within a proximity of the second networked device 404.

In another example, independently of the networked zones, playback devices can be grouped together to form "playback zones." Separately, illumination devices can be grouped together to form "illumination zones."

In a particular example, the second and third networked devices 404, 406 are not grouped together to form networked zone. Instead, the illumination devices of the second and third networked devices 404, 406 are grouped together to form a first illumination zone and the playback device of the second networked device 404 is part of a first playback zone and the playback device of the third networked device 406 is part of a second (different) playback zone.

In one example, one or more state variables identify the playback devices as members of a particular playback zone group, such as "Playback Group 1" or a "Living Room Playback Group". Similarly, one or more state variables identify the illumination devices as members of a particular playback zone group, such as "Illumination Group 1" or a "Living Room Illumination Group". As mentioned, these state variables may be stored in memory for later retrieval.

Accordingly, in some examples, after determining that the second networked device 404 is within a proximity of the remote 414, it is determined that the illumination devices of the second and third networked devices 404, 406 form at least part of a first illumination zone and that the playback device of the second networked device 404 forms at least part of a first playback zone. It may also be determined that the playback device of the third networked device 406 forms at least part of a second playback zone. In some examples, it is also determined that the third networked device 406 is within a proximity of the remote 414.

Accordingly, input data to the remote 414 may therefore be indicative of a command to control the playback device of the first playback zone, but not the second playback zone. Thus, as a user operates the remote 414, the generated input data comprises one or more commands to control the playback device of the second networked device 404. For example, a user may press a particular button on the remote 414, which generates input data indicative of a command to control the playback device of the second networked device 404. The command may be to "play" or "resume" playback of a media item. The command is then transmitted to the second networked device 404 (via any of the methods described in FIGS. 3 and 4) which executes the command (i.e. the playback device plays back the media content). The playback device of the third networked device 406 does not execute the command because it is part of a different playback zone. In contrast, because the illumination devices of the second and third networked devices are part of the same illumination zone, when a user presses a particular button on the remote 414, the remote 414 generates input data indicative of a command to control the illumination devices of the first illumination zone (i.e. the second and third networked devices 404, 406). The command may be to "turn on" the illumination devices. The command is then transmitted to the second networked device 404 (via any of the methods described in FIGS. 3 and 4) which executes the command (i.e. the illumination device turns on). The command is also transmitted to the third networked device 406 which executes the command (i.e. the illumination device turns on). The command for the third networked device 406 may be transmitted via the second networked device 404, in some examples.

At a later moment in time, the user carries the remote 414 into the third room 420 to location 4. As a result, it is detected that the fourth networked device 408 is within a proximity of the remote 414. In some examples, it is further detected that the third networked device 406 is also within a proximity of the remote 414. After detecting that the fourth networked device 408 is within a proximity of the remote 414, it may be determined that, although within a proximity of both the fourth networked device 408 and the third networked device 406, the third and fourth networked devices 406, 408 are not grouped together to form a networked zone. In some examples, it may also be determined that the third and fourth networked devices 406, 408 are not located within the same room or area and/or that the illumination devices of the third and fourth networked devices 406, 408 are not grouped together in an illumination zone and/or that the playback devices of the third and fourth networked devices 406, 408 are not grouped together in a playback zone. Accordingly, the remote 414 is therefore configured to control the fourth networked device 408. In an example, the remote 414 is configured to control the fourth networked device 408 because it is determined to be "closer" to the fourth networked device 408 than the third networked device 406.

Location Detection

In the examples described above, the location of the remote 414 can be determined by a variety of methods. Some example location determination methods are described below. It will be appreciated that other methods may be used.

a. Location Determination Method 1

In a first example, the remote 214, 414 receives a signal from a computing device (such as a Bluetooth (BLE) beacon or an NFC module) that is located at a particular location within the playback system. FIGS. 3A-3C, 4A-4B, and 5 depict an example computing device 224 located within the playback system. There may be multiple computing devices located throughout the playback system, each associated with a different location. When brought into proximity of a computing device, the remote receives a signal, and based on the signal determines one or more networked devices that are associated with that computing device and/or location. For example, based on the signal the remote determines one or more "nearby" networked devices.

In some examples, the signal comprises data indicative of a location/room/area, such as "Room #1", "Area #1" or "Living Room". The location data can then be used to retrieve a list of one or more networked devices associated with that location. A database may store an association between networked devices and their locations.

In some examples, the signal comprises data indicative of one or more device identifiers, which may identify the computing device and/or a one or more networked devices associated with the computing device and/or location. For example, the signal may contain an identifier of the computing device, which is then used to retrieve a location and/or one or more networked devices associated with the computing device and/or location. In examples where the signal comprises one or more networked device identifiers, the signal may also comprise one or more state variables associated with the networked devices (including any of the state variables described above). In a particular example, the state variables associated with the networked device identify a room or area in which the networked device is located, and networked zones and/or playback zones and/or illumination zones that the networked device is part of. In other examples, the networked device identifiers are used to obtain state variables associated with the networked device.

As an example, referring to any of FIGS. 3A-3C, the remote 214 receives a signal from a BLE beacon 224, and the signal comprises a device identifier identifying the ceiling speaker 202. Based on this signal, the remote 214 determines that it is located within a proximity of the ceiling speaker 202. In another example, referring to FIG. 5, the remote 414 receives a signal from a BLE beacon 224, and the signal identifies the second and third networked devices 404, 406. Based on this signal, the remote 414 determines that it is located within a proximity of the second and third networked devices 404, 406. In some examples, the signal also comprises one or more of the state variables described above. The state variables can identify the networked zones, playback zones and/or illumination zones associated with the second and third networked devices 404, 406. In another example of FIG. 5, the remote 414 receives a signal from the BLE beacon 224, and the signal identifies only the second networked device 404. The remote 414 may then determine that the second networked device 404 forms part of a networked zone with the third networked device 406 via other means, such as receipt of state variables from another device within the playback system.

In some examples, the computing device is separate to the networked device, but in other examples the networked device may comprise the computing device. For example, the ceiling speaker 202 may itself comprise a BLE beacon 224.

b. Location Determination Method 2

In a second example, as the remote 214, 414 moves throughout the environment, motion of the remote is detected. The remote may comprise one or more motion detection sensors, such as an accelerometer, gyroscope, and/or altimeter, for example. Based on the detected motion, a location of the remote can be determined or inferred. For example, based on a characteristic of the motion (such as a duration, estimated distance travelled, atmospheric pressure changes and/or type of motion), it may be determined that the remote has moved up a flight of stairs, and so it may be determined that the remote is now located "upstairs". Based on this location, it may be determined that the remote is within a proximity of one or more networked devices. For example, a database or one or more state variables may identify one or more networked devices associated with the determined location.

In another example, if an initial location of the remote is known, the motion is known to begin from this initial location. Again, based on a characteristic of the motion, it may be determined that the remote has moved to a final location. In some examples, based on the detected motion, a distance can be determined. Using the initial location and the distance, a final location may be determined, for example using dead-reckoning techniques.

In some examples, a database stores an association between a plurality of "motion signatures" and one or more locations. For example, a first motion signature may be generated by the motion sensor when the remote is moved between a first location and a second location, and a second motion signature may be generated by the motion sensor when the remote is moved between the second location and a third location. Based on a comparison of a detected motion with the motion signatures in a database, a location of the remote can be determined. For example, the detected motion may correspond to the second motion signature in the database, so it may be determined that the remote is located in the third location. The detected motion may comprise one or more motion signatures. For example, if the remote is moved from the first to the third location, the detected motion may comprise the first motion signature followed by the second motion signature. The first, second and third locations may be predetermined, such as docking station locations.

The database may be initially populated during a calibration procedure. For example, a user may be required to move the remote between several locations (such as between different networked devices and/or rooms) during a setup procedure.

In some examples, the location may be determined using machine learning techniques. Entries in the database may be updated over time based on machine learning algorithms.

c. Location Determination Method 3

In a third example, the location of the remote can be determined based on the strength of signals received from one or more devices (such as one or more networked devices). In one example, a remote may be determined to be within a proximity of a first networked device by receiving from the first networked device a signal having a signal strength and determining that the signal strength is above a threshold. If the signal strength above the threshold, it may be assumed that the remote is near to the first networked device, thus the location of the remote can be determined. In some examples, the signal is a radio signal, such as a WiFi, Bluetooth or ZigBee signal, and the threshold can be based on signal strength and/or quality measure such as RSSI or BER. In other examples, the signal is an acoustic signal emitted by a playback device. The signal strength of an acoustic signal can therefore be the acoustic intensity of the acoustic signal. In certain examples, the acoustic signal is near ultrasonic (e.g., in the frequency range of 19 kHz to 20 kHz) or ultrasonic (e.g., greater than about 20 kHz).

In another example, a remote may be determined to be within a proximity of a first networked device by receiving from the first networked device a first signal having a first signal strength and receiving from a second networked device a second signal having a second signal strength. When the first signal strength is stronger/greater than the second signal strength, it can then be determined that the remote is closer to the first networked device than the second networked device. Thus, based on the first and second signal strengths, the location of the remote can be determined. In some examples, the first and second signals are radio signals, such as WiFi, Bluetooth or ZigBee signals. In other examples, the first and second signals are acoustic signals emitted by the playback devices of the networked devices.

The signal received from the networked device comprises data or a characteristic associated with a particular networked device and/or a location. For example, an electromagnetic signal (such as a radio signal) may comprise data indicative of the networked device from which it was transmitted and/or a location. Certain techniques also allow data to be carried by acoustic signal. Accordingly, an acoustic signal may also comprise data indicative of a networked device and/or a location. Alternatively, an acoustic signal may comprise a particular acoustic characteristic associated with the networked device and/or location. For example, different devices may transmit acoustic signals using different frequencies, which are used to identify the networked device and/or location. The remote may comprise a microphone to detect the acoustic signals.

As an example, in FIG. 5, the remote 414 receives two signals; a first signal from the second networked device 404 and a second signal from the third networked device 406. Each signal comprises data associated with the playback device from which it was transmitted. Upon receipt of both signals, the remote 414 determines that the first signal has a signal strength that is stronger than the signal strength of the second signal. Accordingly, the remote 414 determines that it is located closer to the second networked device 404 than the third networked device 406. The remote 414 is therefore located in location 2, for example. Other examples for determining the location of a device are described in U.S. Patent Publication 2021/009829 published Apr. 1, 2021, and titled "SYSTEMS AND METHODS FOR DEVICE LOCALIZATION," which is herein incorporated by reference in its entirety.

d. Location Determination Method 4

In a fourth example, the location of the remote can be determined based on data encoded within an acoustic signal. In an example, the remote comprises a microphone to detect acoustic signals. A networked device may transmit data within an acoustic signal, such as a near ultrasonic or an ultrasonic signal, which is then received by the microphone of the remote. The acoustic signal may comprise data indicative of a location/room/area (which can be used to retrieve a list of one or more networked devices associated with that location) and/or data indicative of one or more device identifiers associated with one or more networked devices. Accordingly, based on the signal, and in particular the data transmitted by the signal, it can be determined that the remote is within a proximity of one or more networked devices. Acoustic signals may be transmitted periodically by some or all of the networked devices within a playback system so that the remote's location can be updated as it moves throughout the playback environment. Acoustic signals emitted from devices that are further away from the remote, or are located within other rooms, may not be detected by the microphone of the remote. Examples for determining that the remote is within proximity of one or more networked devices and/or a nearest network device to the remote are described in U.S. Patent Publication 2020/0401365 published Dec. 24, 2020, and titled "Ultrasonic Transmission for Presence Detection," which is herein incorporated by reference in its entirety.

e. Location Determination Method 5

In a fifth example, the location of the remote can be determined based on data received from a docking station into which a remote may be placed by a user. A docking station may hold or store the remote when not in use, and in some examples allows a battery of the remote to be recharged. Typically, a docking station remains in a particular location for an extended period of time, and so may be associated with that location. A user may configure the docking station to be associated with a location during a setup procedure, for example. When coupled to the docking station, via one or more wired or wireless interfaces, it can be determined that the remote is located in the docking station and so is associated with that location. Accordingly, it may be detected that the remote is associated with (i.e. docked in) a docking station. While docked, the remote can receive data from the docking station (such as an identifier of the docking station, one or more networked device identifiers, or a location identifier, for example). Based on the received data, it may be determined that the control device is within a proximity of a particular networked device.

In a particular example, at a first instance, the remote is initially configured to control a first networked device. After this, a user places the remote in a docking station, and the remote receives data from the docking station associated with (or identifying) a second networked device. Accordingly, it may be assumed that the remote is now within a proximity of the second networked device, and in response, the remote is configured to control the second networked device instead of the first networked device.

Grouping Devices

In some examples, the remote can be used to group together one or more networked devices by moving the remote throughout the playback environment to group particular devices. In an example of FIG. 5, if a user wants to group together the first, second, third and fourth networked devices 402-408 (to form a first networked zone, for example), the user can provide a first input to the remote 414 (such as pressing and holding a particular button) while moving the remote 414 from location 1 to location 4, via locations 2 and 3. As the remote 414 is moved, it is detected that the remote is moved within a proximity of each of the four networked devices. When a second input to the remote is detected (such as the user releases the button), the detected networked devices are grouped together.

In another example, a user wishing to group together the second and third networked devices 404, 406 can provide a first input to the remote 414 (such as a double or triple tap of a particular button on the remote 414) to indicate the start of a grouping procedure, move the remote 414 from location 2 to location 3, and can provide a second input to the remote 4141 (such as a double or triple tap of a particular button on the remote 414) to indicate an end of the grouping procedure. As the remote 414 is moved between locations, it is detected that the remote is within a proximity of both networked devices. At the end of the grouping procedure, the two networked devices are grouped together.

In yet another example, a user can save a scene, settings, or preferences that specify actions to take, or a response based on events or context. For example, a user can select a setting to control all networked devices within proximity or in the same room as the remote 414 as grouped devices even though the networked devices may not have been grouped. In this instance, the networked devices may be temporarily grouped when the remote 414 is within proximity.

Accordingly, a method of grouping together one or more networked devices using a remote comprises: detecting that the first networked device is within a proximity of the remote and receiving input data indicative of a command to start a grouping procedure to group the first networked device with at least one other networked device. In response to (or after) the input data, a grouping procedure is initiated, and during the grouping procedure, it is detected that a second networked device is within a proximity of the remote (as the remote is moved to a different location). The method further comprises receiving input data indicative of a command to end the grouping procedure, and after receiving the input data, the method comprises causing the first and second networked devices to form a group. For example, the remote (or another device) transmits a command to one or both of the first networked devices to join a particular zone, such as a first networked zone.

In an example, detecting the input data indicative of a command to start the grouping procedure may comprise detecting that a button of the remote is being pressed and held down. Detecting the input data indicative of a command to end the grouping procedure may comprise detecting that the button of the remote is released. The button may be held down for a duration of time, during which time the remote is moved between a plurality of networked devices.

In some examples, before the grouping procedure starts, a first networked device is playing back media content and a second networked device is not playing back media content. In response to (or after) grouping the first and second networked devices, the method may further comprise causing the second networked device to play back media content in synchrony with the first networked device. Thus, once grouped, both grouped devices play back media content in synchrony as members of the group.

Remote Interface

FIGS. 6A-6C depict a remote 214 useable in any or all of the examples described above. In this particular example, the remote 214 comprises a plurality of input interfaces 602a-g (e.g., one or more buttons, knobs, dials, touch-sensitive surfaces, displays, touchscreens). A user can operate an input interface 602a-g to control various functions of a networked device. For example, if a user operates input interface 602c, input data is generated (and therefore received by the remote 214) and in response, one or more commands are transmitted by the remote to a particular networked device currently being controlled. Upon receipt of the command, a playback device of the networked device may begin playing back a media item or an illumination device of the networked device may turn on, for example.

In this example, the remote 214 is configurable in at least two modes, such as a first mode and a second mode. When operating in a particular mode, commands associated with the input interfaces 602a-g are configured to control a particular device of a networked device. In an example, when operating in a first mode (also known as a light mode), the remote is configured to control an illumination device of at least one networked device. Thus, when an input interface 602a-g is operated, a command to control an illumination device is generated. Similarly, when operating in a second mode (also known as an audio mode, a sound mode or a music mode), the remote is configured to control a playback device of at least one networked device. Thus, when an input interface 602a-g is operated, a command to control a playback device is generated.

In some examples, the remote 214 is configurable in three modes (such as the first mode, the second mode and a third mode). The first and second modes are the same as described above, but when operating in the third mode (also known as a hybrid mode), the remote is configured to control an illumination device and a playback device of at least one networked device. For example, some input interfaces 602a-g may control the illumination device and other input interfaces 602a-g may control the playback device. Additionally, or alternatively, some or all input interfaces 602a-g have dual functionality and control either the playback device or illumination device depending upon the type of input to the input interface 602a-g. For example, if a user presses a particular input interface 602a-g it may control the illumination device, and if a user double taps the same input interface 602a-g it may control the playback device. Thus, depending upon the type of input to the input interface 602a-g (e.g. a single or double tap), different input data and commands are generated and transmitted by the remote.

FIG. 6A depicts the remote 214 operating in the light mode (i.e. the first mode). At this moment, the remote 214 is in proximity to a first networked device and is thus configured to control the first networked device. The first networked device in this example comprises an illumination device and a playback device. When configured to control the first networked device, commands generated by the remote 214 (in response to (or after) receipt of input data as the input interfaces 602a-g are operated), are addressed/transmitted to the first networked device. In some examples, the remote 214 is configured to control the first networked device and a second networked device as part of a networked zone. Thus, commands generated by the remote 214 (in response to (or after) receipt of input data as the input interfaces 602a-g are operated), are addressed/transmitted to the first and second networked devices.

While controlling the first networked device and while operating in the light mode, a user may operate a particular input interface 602a-g, which causes input data to be generated (and therefore received by the remote 214). Depending upon which input interface 602a-602g is operated, the input data is indicative of a command to control a particular aspect of the illumination device, such as light on/off, brightness up/down, or change light colour. In response to (or after) receiving the input data, the remote 214 controls the illumination device by transmitting a command to the first networked device, which is then executed/acted upon by the illumination device.

Similarly, while controlling the first networked device and while operating in the sound mode, a user may operate a particular input interface 602a-g, which causes input data to be generated (and therefore received by the remote 214). Depending upon which input interface 602a-602g is operated, the input data is indicative of a command to control a particular aspect of the playback device, such as pause, play, volume up/down, or skip forward/back. Accordingly, at least some of the input interfaces 602a-g correspond to transport controls while the remote is operating in the sound mode. In response to (or after) receiving the input data, the remote 214 controls the playback device by transmitting a command to the first networked device, which is then executed/acted upon by the playback device.

In some examples, the remote 214 comprises a motion sensor to detect certain motions or gestures. These gestures may control certain functions of a networked device. For example, a gesture such as turning over the remote 214 may generate input data indicative of a command to control a particular aspect of the playback device or the illumination device.

In some examples, the command to control the illumination device or playback device (that is transmitted to the first networked device) explicitly indicates that the command is to control the illumination device or playback device (depending upon which mode the remote 214 is currently operating in). For example, the command may indicate "volume up", or "button 602*d*, sound mode", both of which would indicate that the command is for the playback device. In other examples however, the command to control the illumination device or playback device does not indicate that the command is to control the illumination device or playback device. Instead, the command may indicate which input interface 602*a-g* has been pressed, such as "button 602*d*". To execute the command as intended, the first networked device would therefore need to know which mode the remote 214 is currently operating in. This information may therefore have been transmitted to the first networked device prior to receipt of the command, and the first networked device retrieves this information from memory before executing the intended command. For example, if the command indicates that button 602*d* has been pressed, it may execute a volume up command if the remote 214 is determined to be operating in the sound mode or may execute a brightness up command if the remote 214 is determined to be operating in the light mode. Thus, in some examples, the remote 214 may transmit to one or more devices, such as one or more networked devices, data indicating the mode in which it is currently operating. The mode may be stored in one or more state variables which are shared amongst devices in the playback system. The remote 214 may transmit this information when the remote 214 changes between different modes, for example.

To change between modes, a user may operate at least one input interface 602*a-g*. For example, to cause the remote 214 to operate in the light mode the user operates input interface 602*a*, and to cause the remote 214 to operate in the sound mode the user operates input interface 602*b*. To cause the remote 214 to operate in the hybrid mode, the user may operate both input interfaces 602*a* and 602*b* at the same time. FIG. 6A shows the remote 214 operating in the light mode, FIG. 6B shows the remote 214 operating in the sound mode, and FIG. 6C shows the remote 214 operating in the hybrid mode. In some examples, there is a single input interface that causes the remote to cycle from one mode to another or switch between modes.

Accordingly, while operating in the sound mode (or hybrid mode), a user may operate input interface 602*a*, which causes input data to be generated (and therefore received by the remote 214). The input data is indicative of a command to operate the remote 214 in the light mode, and in response, the remote 214 begins to operate in the light mode. As mentioned above, operating in the light mode may comprise transmitting data indicating that the remote is operating in the light mode, to at least a first networked device. In some examples, operating in the light mode comprises the remote 214 associating input data with the light mode.

Similarly, while operating in the light mode (or hybrid mode), a user may operate input interface 602*b*, which causes input data to be generated (and therefore received by the remote 214). The input data is indicative of a command to operate the remote 214 in the sound mode, and in response, the remote 214 begins to operate in the sound mode. As mentioned above, operating in the sound mode may comprise transmitting data indicating that the remote is operating in the sound mode, to at least a first networked device. In some examples, operating in the sound mode comprises the remote 214 associating input data with the sound mode.

Similarly, while operating in the light mode or sound mode, a user may operate input interfaces 602*a* and 602*b* at the same time, which causes input data to be generated (and therefore received by the remote 214). The input data is indicative of a command to operate the remote 214 in the light and sound mode simultaneously (i.e. operate the remote 214 in the hybrid mode), and in response, the remote 214 begins to operate in the hybrid mode. As mentioned above, operating in the hybrid mode may comprise transmitting data indicating that the remote is operating in the hybrid mode, to at least the first networked device. Operating in the hybrid mode may comprise associating input data with the hybrid mode and/or one of the light and sound modes.

As an example implementation, the remote 214 is initially operating in the light mode and is controlling a first networked device (as in FIG. 6A). A user first turns on the illumination device (thereby causing a light to turn on) by pressing input interface 602*c*. The user then decreases the brightness of the illumination device by pressing input interface 602*g*, and changes the colour of the light from white to red to blue by pressing input interface 602*d* twice. The user then switches to the sound mode by pressing input interface 602*b* (as in FIG. 6B), and causes the playback device to start playing back media by pressing input interface 602*c*. The user then skips backward in the playback queue by pressing input interface 602*g*, and increases the volume by pressing input interface 602*d* several times. Accordingly, the same input interfaces (operated at different times) can control different aspects of the first networked device based on the mode in which the remote 214 is operating. In some examples, skipping forward or back using the remote causes a cross-fade of music.

The user may also operate the remote in a hybrid mode by pressing input interfaces 602*a* and 602*b* at the same time (as in FIG. 6C). In this example, in the hybrid mode, input interfaces 602*c-g* have dual functionality and control either the playback device or illumination device depending upon the type of input to the input interface 602*c-g*. For example, at a later time the user decides to pause playback, so presses input interface 602*c*. The user also decides to turn off the illumination device, so double presses input interface 602*c*. Accordingly, the same input interfaces can control different devices of the first networked device based on the type of input to the input interface.

In some examples, the remote 214 may be configured to operate in a particular mode by default. For example, when the remote 214 is turned on, it may default operation to the first or second mode. The remote 214 may be configured to operate in a particular mode at different times of the day. For example, the remote may default to operating in the sound mode during the daytime (when lights are less likely to be required) and default to operating in the light mode or hybrid mode during the nighttime (when lights are more likely to be required). Daytime and nighttime may be set according to certain time ranges, such as daytime=7 am-6 pm, nighttime=6 pm-7 am. Daytime/nighttime may be automatically determined via reference to sunrise and sunset timetables, or by use of a light sensor in the remote 214 or in another device. For example, if the light sensor indicates that it is dark, the remote may default to operating in the light mode.

In some examples, the remote 214 includes input interfaces 602 for scenes. The selection of the scene input interface 602 can send a command to a networked device to activate a scene. A scene may be a saved playback setting or content setting and/or a saved lighting setting. One example scene includes an "all off" setting which stops all music playback and turns off all lighting. Another example scene can be a "relax" setting which dims the light to, for example, 50%, lowers the volume to 10%, and changes the content being played back to a particular genre (e.g., jazz). Other examples are possible.

Indicator Assembly

In some arrangements, the remote 214 comprises an indicator assembly to generate at least one of an audio indication or a visual indication to indicate various events. For example, the indicator assembly can generate an indication to indicate at least one of: (i) that the remote is operating in the first mode, second mode or third mode, (ii) that the remote is within a proximity of a particular networked device, (iii) that the remote is no longer within a proximity of a particular networked device, (iv) that the remote is controlling a particular networked device, or (v) that the remote is not controlling any networked device.

The indicator assembly may comprise one or more indicators, such as one or more visual indicators (such as LEDs or other light emitting devices) and/or one or more audio indicators (such as an acoustic transducer).

FIGS. 6A-6C depict a first visual indicator 604a and a second visual indicator 604b. In this particular example, the visual indicators 604a, 604b both comprise an LED located below the input interfaces 602a and 602b, respectively. Light emitted by the LED is visible through a transparent or translucent surface of the input interfaces 602a, 602b. The first visual indicator 604a is configured to generate a visual indication to indicate that the remote is operating in the light mode. The second visual indicator 604b is configured to generate a visual indication to indicate that the remote is operating in the sound mode. In FIG. 6A, the first visual indicator 604a is generating a visual indication by outputting light, and the second visual indicator 604b is not generating a visual indication. In this example, the indication is in the shape of a sun or star, to more clearly identify its relationship with the light mode. In FIG. 6B, the second visual indicator 604b is generating a visual indication by outputting light, and the first visual indicator 604a is not generating a visual indication. In this example, the indication is in the shape of a musical note, to more clearly identify its relationship with the sound mode.

Accordingly, in examples where the indicator assembly is configured to generate an indication to indicate that the remote 214 is operating in a particular mode, operating the remote 214 in the particular mode further comprises generating the indication. In some examples, the indication is generated throughout the entire period the remote 214 is operating in the particular mode, as in the examples of FIGS. 6A-6C, but in other examples, the indication is generated for a portion of less than all the period the remote 214 is operating in the particular mode. For example, the indication may be generated when the remote 214 first begins to operate in the particular mode.

In FIG. 6C, the remote 214 is operating in the third, hybrid mode. In this particular example, to indicate that the remote 214 is operating in the first and second modes simultaneously (i.e. the hybrid mode), the indicator assembly generates an indication that the remote 214 is operating in the first and second modes simultaneously by having the first visual indicator 604a and the second visual indicator 604b generate simultaneous indications. Thus, FIG. 6C depicts both visual indicators 604a, 606b outputting light.

In some examples, the remote 214 comprises a light sensor configured to detect an intensity of light, such as artificial light or sunlight. The remote 214 may be configured to control the indicator assembly, such as a brightness of LEDs, based on the detected intensity. Thus, in some examples, the brightness of the first and second visual indicators 604a, 604b may be varied according to the detected intensity.

As mentioned, the indicator assembly of the remote 214 can additionally or alternatively generate indications to indicate: (i) that the remote is within a proximity of a particular networked device, (ii) that the remote is no longer within a proximity of a particular networked device, (iii) that the remote is controlling a particular networked device, or (iv) that the remote is not controlling any networked device.

As an example, and by reference to FIG. 5, as the remote 414 moves from location 1 to location 2, it may be detected that the second networked device 404 is within a proximity of the remote 414. In response, the indicator assembly may output an indication to indicate that the presence of a new networked device has been detected. In some examples, the second networked device 404 also comprises an indicator assembly that generates a corresponding indication. For example, a visual indicator (such as an LED) on the second networked device 404 and remote 414 both flash to indicate that the remote 414 is in proximity to the second networked device 404, and is now controlling the second networked device 404. In some examples, the second networked device 404 outputs an audio indication to indicate that it is being controlled by the remote 414. The remote 414 may comprise at least one of a microphone or light sensor and may detect the indication generated by the networked device, for example to verify that it is within a proximity of the networked device.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

In some instances, ceiling speaker or fixture 202 may include an illumination device 206 and not a playback device. In other instances, ceiling speaker 202 may include an illumination device 206 and the playback device 204 may be muted or otherwise disconnected or deactivated such that the ceiling speaker 202 functions only as a light source. For these instances, the discussion above as to example methods and embodiments related to the illumination device are still applicable and suitable for implementation related to the light source.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method for a control device, comprising:
   detecting that a first networked device is within a proximity of the control device;
   after configuring the control device to control the first network device, configuring the control device to control the first networked device that is within the proximity of the control device;
   while controlling the first networked device and while operating in a first mode, receiving, via the control device, first input data, the first input data indicative of a command to control an illumination device of the first networked device;
   after receiving the first input data, controlling the illumination device of the first networked device;
   while controlling the first networked device and while operating in a second mode, receiving, via the control device, second input data, the second input data indicative of a command to control a playback device of the first networked device;
   after receiving the second input data, controlling the playback device of the first networked device;
   detecting that the first networked device is no longer within the proximity of the control device;
   detecting that a second networked device is within the proximity of the control device;
   configuring the control device to control the second networked device;
   while controlling the second networked device and while operating in the first mode, receiving, via the control device, third input data, the third input data indicative of a command to control an illumination device of the second networked device;
   after receiving the third input data, controlling the illumination device of the second networked device;
   while controlling the second networked device and while operating in the second mode, receiving, via the control device, fourth input data, the fourth input data indicative of a command to control a playback device of the second networked device; and
   after receiving the fourth input data, controlling the playback device of the second networked device;
   wherein the control device comprises at least a first button, and wherein operation of the first button at a first time generates the first input data, operation of the first button at a second time generates the second input data, operation of the first button at a third time generates the third input data, and operation of the first button at a fourth time generates the fourth input data.

2. The method of claim 1, further comprising:
   receiving, via the control device, fifth input data, the fifth input data indicative of a command to operate the control device in the first mode;
   after receiving the fifth input data, operating the control device in the first mode;
   receiving, via the control device, sixth input data, the sixth input data indicative of a command to operate the control device in the second mode; and
   after receiving the sixth input data, operating the control device in the second mode.

3. The method of claim 2, wherein the control device comprises an indicator assembly and wherein:
   operating the control device in the first mode comprises generating, by the indicator assembly, at least one of an audio indication or a visual indication to indicate that the control device is operating in the first mode; and
   operating the control device in the second mode comprises generating, by the indicator assembly, at least one of an audio indication or a visual indication to indicate that the control device is operating in the second mode.

4. The method of claim 3, wherein the indicator assembly comprises a first indicator and a second indicator, and wherein:
   operating the control device in the first mode comprises generating, by the first indicator, at least one of an audio indication or a visual indication to indicate that the control device is operating in the first mode; and
   operating the control device in the second mode comprises generating, by the second indicator, at least one of an audio indication or a visual indication to indicate that the control device is operating in the second mode.

5. The method of claim 1, further comprising:
   receiving, via the control device, fifth input data, the fifth input data indicative of a command to operate the control device in the first and second modes simultaneously; and
   after receiving the fifth input data, operating the control device in a hybrid mode, wherein in the hybrid mode, the control device is configured to receive input data indicative of commands to control the playback device and the illumination device.

6. The method of claim 1, further comprising:
determining that the first networked device forms part of a first networked zone, wherein the first networked zone comprises the first networked device and a third networked device, and wherein the first networked device and the third networked device each comprise an illumination device and a playback device;
wherein:
the first input data is indicative of a command to control the illumination devices of the first and third networked devices and wherein controlling the illumination device comprises controlling the illumination devices of the first and third networked devices; and
the second input data is indicative of a command to control the playback devices of the first and third networked devices and wherein controlling the playback device comprises controlling the playback devices of the first and third networked devices.

7. The method of claim 6, further comprising one of:
detecting that the first networked device is within a proximity of the control device; or
detecting that the first and third networked devices are within the proximity of the control device.

8. The method of claim 1, further comprising
detecting that the second networked device is within the proximity of the control device; and
the method further comprising:
determining that the first networked device forms at least part of a first networked zone and the second networked device forms at least part of a second networked zone;
while operating in the first mode, receiving, via the control device, fifth input data;
after receiving the fifth input data, controlling both the illumination devices of the first and second networked devices;
while operating in the second mode, receiving, via the control device, sixth input data; and
after receiving the sixth input data, controlling a playback device of one of the first networked device and the second networked device.

9. The method of claim 1, wherein the control device comprises an indicator assembly, and wherein the indicator assembly is configured to generate at least one of an audio indication or a visual indication after at least one of:
detecting that the first networked device is no longer within the proximity of the control device; or
detecting that the second networked device is within the proximity of the control device.

10. The method of claim 1, wherein detecting that the first networked device is within the proximity of the control device comprises:
receiving, from a computing device, a signal; and
after receiving the signal, determining that the first networked device is within the proximity of the control device.

11. The method of claim 10, wherein one of:
the first networked device comprises the computing device; or
the computing device is separate to the first networked device.

12. The method of claim 1, wherein detecting that the first networked device is within the proximity of the control device comprises:
detecting motion of the control device;
based on the detected motion, determining a location of the control device; and
determining that the first networked device is associated with the location.

13. The method of claim 1, wherein detecting that the first networked device is within the proximity of the control device comprises:
receiving, from the first networked device, a first signal having a first signal strength;
receiving, from the second networked device, a second signal having a second signal strength; and
determining, based on the first and second signal strengths, that the control device is closer to the first networked device than the second networked device, wherein the first signal strength is stronger than the second signal strength.

14. The method of claim 1, wherein detecting that the first networked device is within the proximity of the control device comprises:
receiving, by a microphone of the control device, an acoustic signal from the first networked device; and
based on the acoustic signal, determining that the first networked device is within the proximity of the control device.

15. The method of claim 1, further comprising:
detecting that the control device is associated with a docking station;
while the control device is associated with the docking station, receiving, from the docking station, data associated with the second networked device; and
responsively, configuring the control device to control the second networked device.

16. The method of claim 1, further comprising:
receiving fifth input data, the fifth input data indicative of a command to start a grouping procedure to group the first networked device with at least one other networked device;
during the grouping procedure, detecting that a third networked device is within the proximity of the control device;
receiving sixth input data, the sixth input data indicative of a command to end the grouping procedure; and
after receiving the sixth input data, causing the first and third networked devices to form a group.

17. The method of claim 16, wherein before receiving the fifth input data, the playback device of the first networked device is playing back media content; and
after grouping the first and third networked devices, the method further comprises causing the third networked device to play back the media content in synchrony with the playback device of the first networked device.

* * * * *